United States Patent
Dayanand

(10) Patent No.: US 12,523,124 B2
(45) Date of Patent: Jan. 13, 2026

(54) SUBSEA JUMPER WITH INTEGRATED FILTER

(71) Applicant: Chevron U.S.A. Inc., San Ramon, CA (US)

(72) Inventor: Nikhil Dayanand, Houston, TX (US)

(73) Assignee: CHEVRON U.S.A. INC., San Ramon, CA (US)

(*) Notice: Subject to any disclaimer, the term of this patent is extended or adjusted under 35 U.S.C. 154(b) by 0 days.

(21) Appl. No.: 18/842,878

(22) PCT Filed: Mar. 3, 2022

(86) PCT No.: PCT/US2022/018679
§ 371 (c)(1),
(2) Date: Aug. 30, 2024

(87) PCT Pub. No.: WO2023/167672
PCT Pub. Date: Sep. 7, 2023

(65) Prior Publication Data
US 2025/0179896 A1 Jun. 5, 2025

(51) Int. Cl.
*E21B 43/013* (2006.01)
*E21B 43/017* (2006.01)

(52) U.S. Cl.
CPC .......... *E21B 43/013* (2013.01); *E21B 43/017* (2013.01)

(58) Field of Classification Search
CPC .............................. E21B 43/013; E21B 43/017
See application file for complete search history.

(56) References Cited

U.S. PATENT DOCUMENTS

| 8,011,446 B2 | 9/2011 | Wylie et al. |
| 10,584,579 B2 * | 3/2020 | Padden ................. G01P 13/045 |
| 2020/0002192 A1 | 1/2020 | Labulle et al. |

FOREIGN PATENT DOCUMENTS

| KR | 101469634 B1 | 12/2014 | |
| WO | WO-2010142612 A1 * | 12/2010 | ............. B01D 29/52 |
| WO | WO-2020111949 A1 * | 6/2020 | ........... B01D 63/069 |

OTHER PUBLICATIONS

Harry Kim, PCT International Search Report, Jun. 3, 2022, 2 pages, US as receiving office.
Harry Kim, Written Opinion of the International Search Authority, Jun. 3, 2022, 8 pages, US as receiving office.

* cited by examiner

*Primary Examiner* — James G Sayre
(74) *Attorney, Agent, or Firm* — Smith & Woldesenbet Law Group, PLLC

(57) ABSTRACT

A subsea jumper for filtering a fluid produced during a subsea field operation can include a housing having a housing wall forming a cavity, where the housing has an upstream end and a downstream end that define a length of the housing. The subsea jumper can also include a filter disposed within the cavity along the length, where the filter defines a first flow area and a second flow area within the cavity. The upstream end can be configured to receive the fluid in an unfiltered state from a first subsea production system component into the first flow area within the cavity, where the downstream end is configured to distribute the fluid in a filtered state from the second flow area in the cavity to a second subsea production system component, and where the filter is configured to remove solids as the fluid passes through the filter.

18 Claims, 14 Drawing Sheets

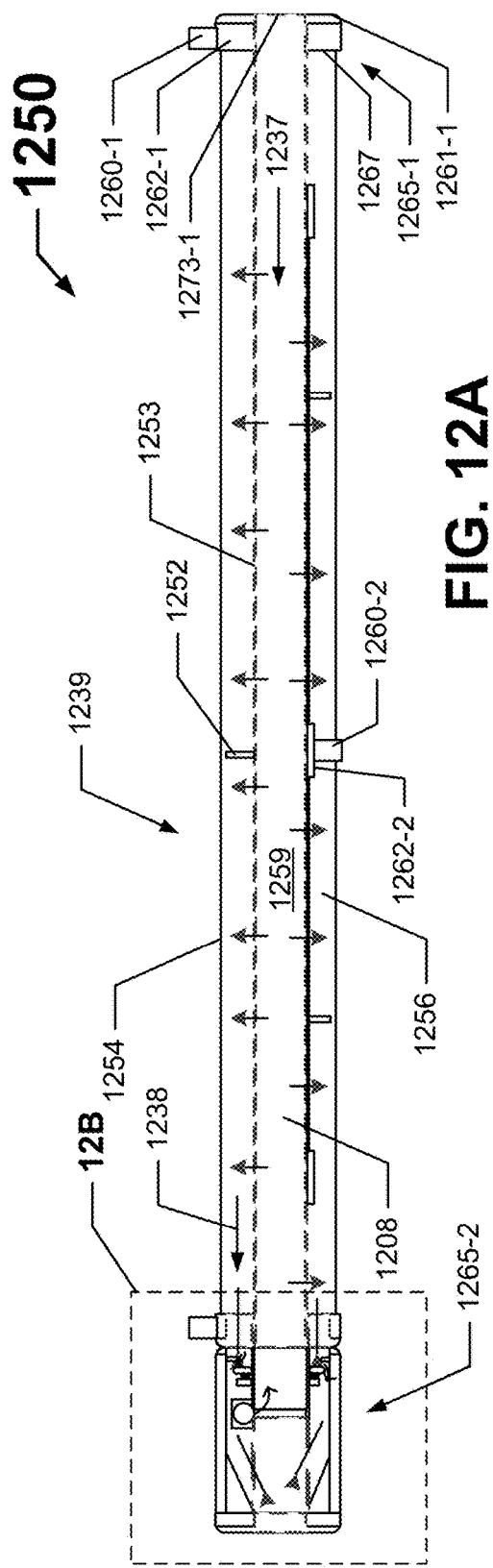
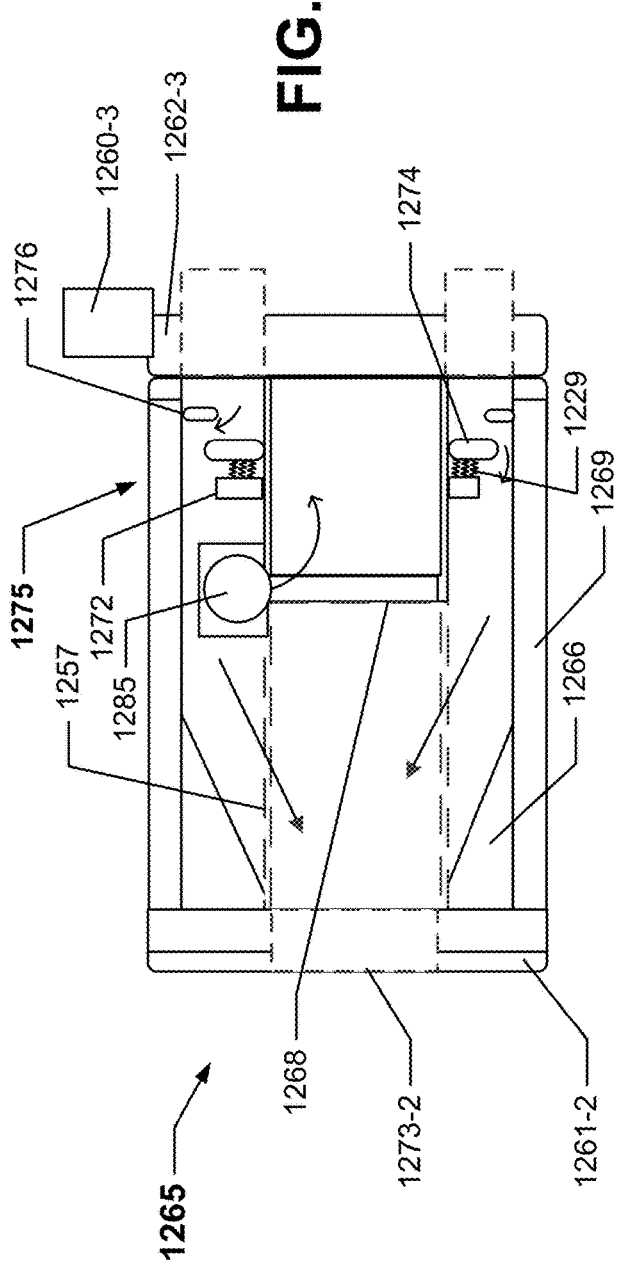
FIG. 12A
FIG. 12B

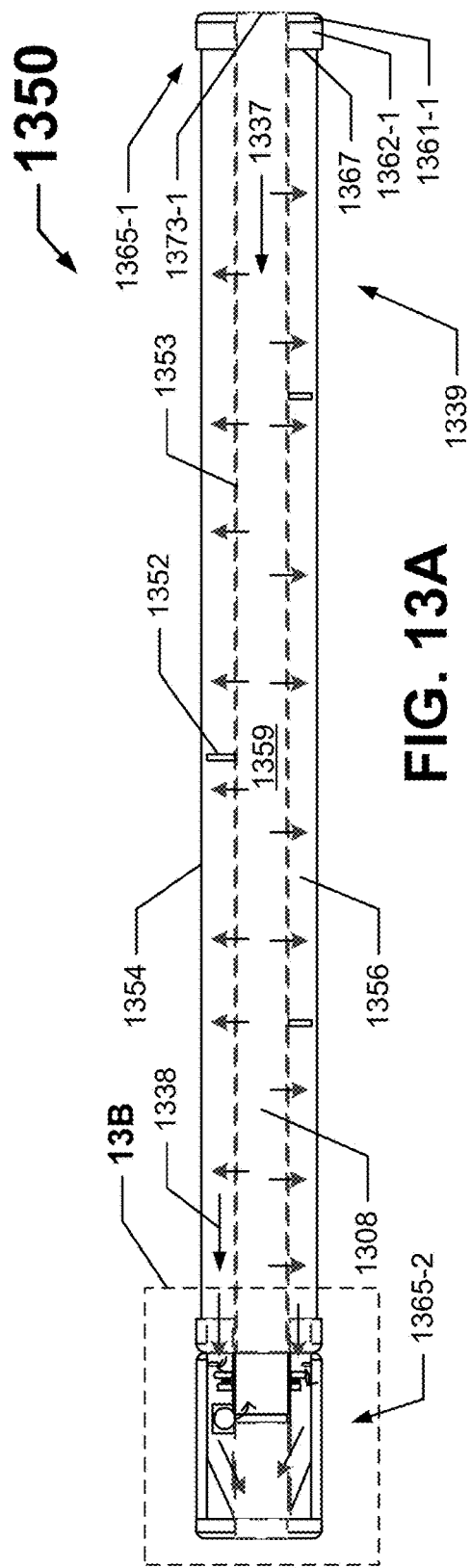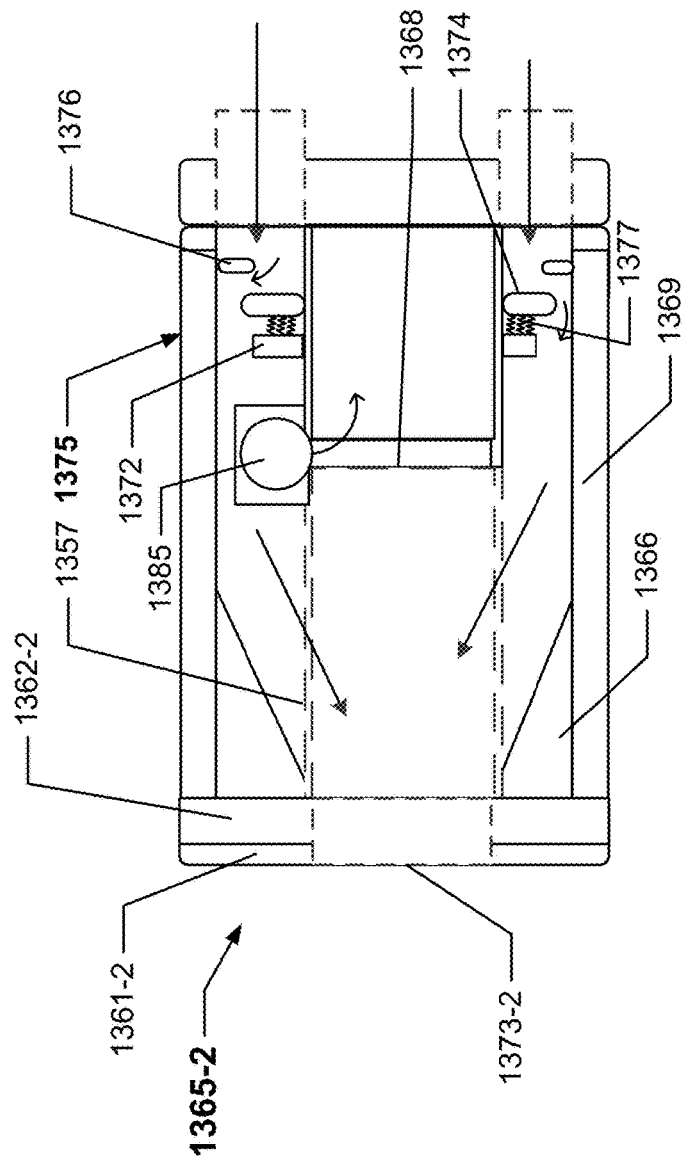

SUBSEA JUMPER WITH INTEGRATED FILTER

CROSS-REFERENCE TO RELATED APPLICATIONS

This application claims priority under 35 U.S.C. § 371 to Patent Cooperation Treaty Patent Application Serial Number PCT/US2022/018679, titled "Subsea Jumper With Integrated Filter" and filed on Mar. 3, 2022, the entire contents of which are hereby incorporated herein by reference.

TECHNICAL FIELD

The present application is related to subsea field operations and, more particularly, to systems and methods for systems and methods for subsea jumpers with integrated filters.

BACKGROUND

During certain phases or stages of subsea field operations, such as the production phase, fluids (e.g., production fluids, oil, gas) are transported through piping and various components (e.g., manifolds, chokes, pumps) of a subsea field system. These fluids can include solid particles (e.g., fines, sand, rock) that can erode and/or clog some or all of these components and/or piping. This erosion and/or clogging can lead to damage to and eventual catastrophic failure of the components and/or piping. For example, with a pump used to move fluids, the particles in the fluid can lead to cracks in the pump and/or holes in the pump, which can lead to excessive vibrations in the pump, loss of sufficient pressure in the pump, and/or other problems that result in catastrophic failure of the pump. When a pump fails, the production phase is interrupted.

SUMMARY

In general, in one aspect, the disclosure relates to a subsea jumper for filtering a fluid produced during a subsea field operation. The subsea jumper can include a housing having a housing wall forming a cavity, where the housing has an upstream end and a downstream end that define a length of the housing, where the downstream end of the housing is configured to couple to a first subsea production system component, and where the upstream end of the housing is configured to couple to a second subsea production system component. The subsea jumper can also include a filter disposed within the cavity along the length, where the filter defines a first flow area and a second flow area within the cavity. The upstream end can be configured to receive the fluid in an unfiltered state from the first subsea production system component into the first flow area within the cavity, where the downstream end is configured to distribute the fluid in a filtered state from the second flow area in the cavity to the second subsea production system component, where the fluid in the unfiltered state comprises a subterranean resource and solids, and where the filter is configured to remove at least some of the solids as the fluid passes through the filter from the first flow area to the second flow area to yield the fluid in the unfiltered state In another aspect, the disclosure relates to a subsea system for producing a fluid during a subsea field operation. The subsea system can include a first pipe that receives the fluid in an unfiltered state from a first subsea system component. The subsea system can also include a second pipe that transports the fluid in a filtered state to a second subsea system component. The subsea system can further include a subsea jumper coupled to the first pipe and the second pipe. The subsea jumper can include a housing having a housing wall forming a cavity having a length, where the housing wall has a first end coupled to the first pipe and a second end coupled to the second pipe. The subsea jumper can also include a filter disposed within the cavity along the length, where the filter defines a first flow area and a second flow area within the cavity. The first flow area can receive the fluid in the unfiltered state at the first end, where the fluid, after passing through the filter from the first flow area, flows through the second flow area to the second end in the filtered state, where the fluid in the unfiltered state comprises a subterranean resource and solids, and where the filter is configured to remove at least some of the solids as the fluid passes through the filter from the first flow area to the second flow area.

In yet another aspect, the disclosure relates to a method for filtering a fluid produced during a subsea field operation. The method can include facilitating flow of a fluid in an unfiltered state from a first subsea production system component through a subsea jumper, where the subsea jumper comprises a filter through which the fluid flows, where the filter is configured to remove at least some solids from the fluid to put the fluid in a filtered state. The method can also include facilitating flow of the fluid in the filtered state from the subsea jumper to a second subsea production system component. These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 12A and 12B show another subsea jumper according to certain example embodiments.

FIGS. 13A and 13B show yet another subsea jumper according to certain example embodiments.

DESCRIPTION OF THE INVENTION

Figure 1:
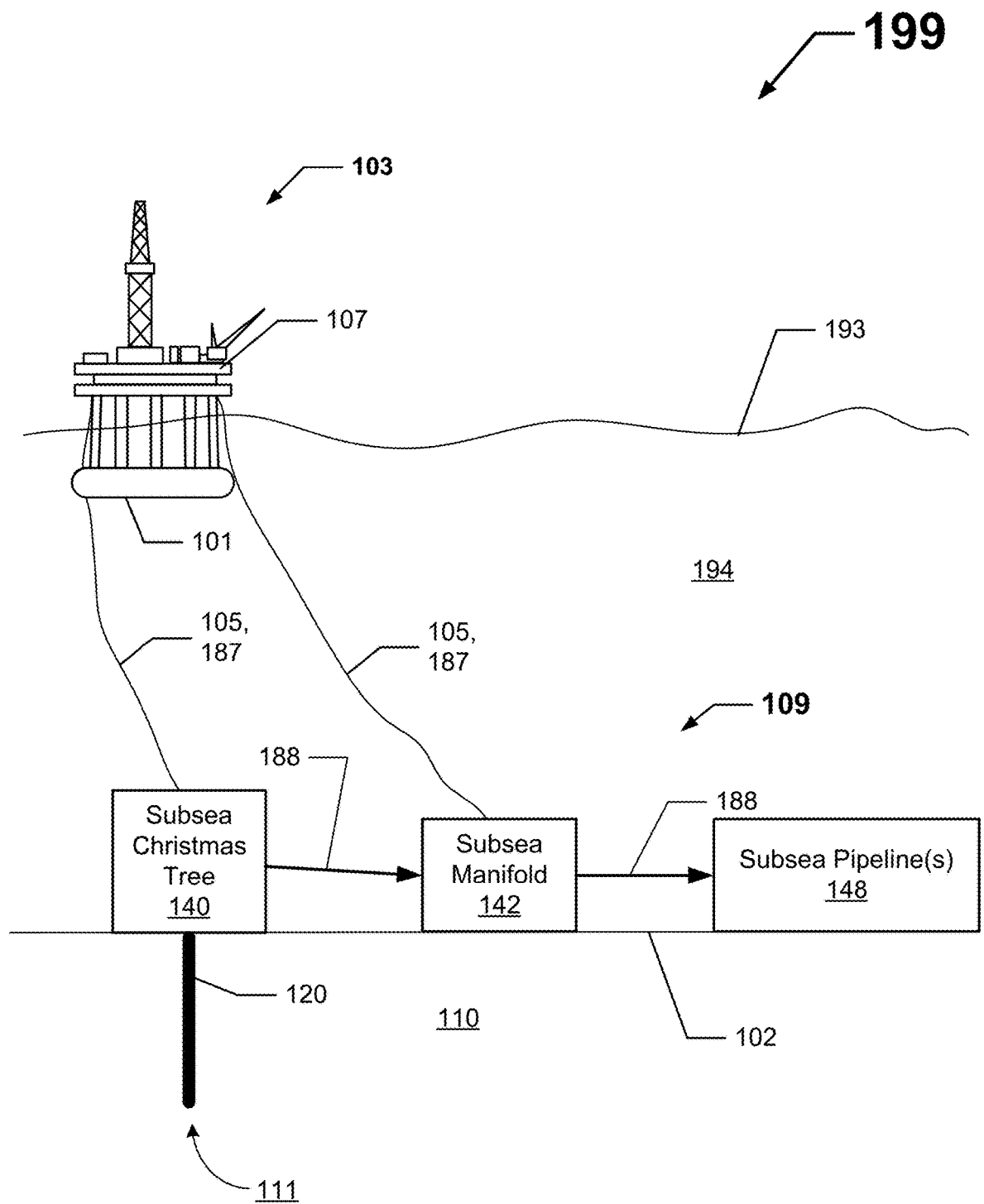
FIG. 1 shows a subsea field system in which example embodiments can be used.

The example embodiments discussed herein are directed to systems and methods with subsea jumpers with integrated filters. Subsea field operations can involve drilling, completing, transporting, and/or producing a subterranean resource that is extracted from a subterranean formation. Examples of a subterranean resource can include, but are not limited to, natural gas, oil, and water. A subsea field operation can last for any duration of time (e.g., one month, one year, five years, one decade) and can be continuous or have multiple interruptions or pauses. Example embodiments of systems and methods for subsea jumpers with integrated filters can be rated for use in hazardous environments. The systems (including portions thereof) with which example embodiments can be used are located, at least in part, under water (e.g., a sea, an ocean, a lake), also called subsea herein.

Example embodiments of subsea jumpers with integrated filters include multiple components, where a component can be made from a single piece (as from a cast, a mold, from a 3D printing process, or an extrusion). When a component (or portion thereof) of an example embodiment is made from a single piece, the single piece can be cut out, bent, stamped, and/or otherwise shaped to create certain features, elements, or other portions of the component. Alternatively, a component (or portion thereof) of an example embodiment can be made from multiple pieces that are mechanically coupled to each other. In such a case, the multiple pieces can be mechanically coupled to each other using one or more of a number of coupling methods, including but not limited to adhesives, welding, fastening devices (e.g., bolts), compression fittings, mating threads, and slotted fittings. One or more pieces that are mechanically coupled to each other can be coupled to each other in one or more of a number of ways, including but not limited to fixedly, hingedly, rotatably, removably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example subsea jumper with integrated filter) can be made of one or more of a number of suitable materials, including but not limited to metal (e.g., stainless steel), ceramic, rubber, glass, and plastic.

When used in certain systems (e.g., for certain subsea field operations), example embodiments can be designed to help such systems comply with certain standards and/or requirements. Examples of entities that set such standards and/or requirements can include, but are not limited to, the Society of Petroleum Engineers, the American Petroleum Institute (API), the International Standards Organization (ISO), the International Association of Classification Societies (IACS), and the Occupational Safety and Health Administration (OSHA). Also, as discussed above, example systems for evaluating securing systems for floating structures using virtual sensors can be used in hazardous environments, and so subsea systems that include example subsea jumpers with integrated filters can be designed to comply with industry standards that apply to hazardous environments.

If a component of a figure is described but not expressly shown or labeled in that figure, the label used for a corresponding component in another figure can be inferred to that component. Conversely, if a component in a figure is labeled but is not described, the description for such component can be substantially the same as the description for the corresponding component in another figure. The numbering scheme for the various components in the figures herein is such that each component is a three-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings can be capable of being included in one or more claims that correspond to such one or more particular drawings herein.

Example embodiments of systems with subsea jumpers with integrated filters will be described more fully hereinafter with reference to the accompanying drawings, in which example embodiments of systems with subsea jumpers with integrated filters are shown. Subsea jumpers with integrated filters may, however, be embodied in many different forms and should not be construed as limited to the example embodiments set forth herein. Rather, these example embodiments are provided so that this disclosure will be thorough and complete, and will fully convey the scope of systems with subsea jumpers with integrated filters to those of ordinary skill in the art. Like, but not necessarily the same, elements (also sometimes called components) in the various figures are denoted by like reference numerals for consistency.

Terms such as "first", "second", "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. This list of terms is not exclusive. Such terms are not meant to denote a preference or a particular orientation, and they are not meant to limit embodiments of systems with subsea jumpers with integrated filters. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a field system 199 in which example embodiments can be used. The system 199 in this case includes a floating structure 103 in the form of a semi-submersible platform that floats in a large and deep body of water 194. Part (e.g., the topsides 107) of the floating structure 103 is above the water line 193, and at least part (e.g., part of the hull 101) of the rest of the floating structure 103 is in the water 194 (subsea) below the water line 193. The floating structure 103 in this case is used for subterranean field operations (also called subsea field operations herein), in which exploration and production phases (also called stages) of the subsea field operation are executed to extract one or more subterranean resources 111 (e.g., oil, natural gas, water, hydrogen gas) from and/or inject resources (e.g., carbon monoxide) into the subterranean formation 110 via a wellbore 120.

In alternative embodiments, as when a subsea operation is close to land, the structure 103 can be land-based rather than floating. Further, in some cases, a field operation involves multiple wellbores 120 that originate from the same proximate location (sometimes called a pad) on the seabed 102. In such cases, the wellbores 120 can be drilled one at a time, and the wells from a pad can be on production simultaneously. Also, in such cases, there can be one Christmas tree 140 for each wellbore 120.

To extract a subterranean resource 111 from a wellbore on production, a subsea Christmas tree 140 is disposed toward the top of the wellbore 120 at the seabed 102. Piping 188 transfers the subterranean resource 111 from the subsea Christmas tree 140 to a subsea manifold 142. Additional piping 188 transfers the subterranean resource 111 from the subsea manifold 142 to one or more subsea pipelines 148. Example subsea jumpers with integrated filters can be placed in line with the piping 188 and/or can be used to replace a segment of piping 188.

There can be one or more of a number of components and/or systems (e.g., a subsea pump, a subsea compressor, a subsea process cooler) positioned between a subsea Christmas tree 140 and the subsea pipelines 148 to assist in extracting the subterranean resource 111. There can be one or more communication links 105 and/or power transfer links 187 between one or more of the subsea components (e.g., the subsea Christmas tree 140, the subsea manifold 142, one or more of the subsea pipelines 148) and one or more components (e.g., a generator, a controller) disposed on the topsides 107 of the floating structure 103 (or land-based structure 103, as the case may be).

The subsea Christmas tree 140 is a stack of vertical and horizontal valves, spools, pressure gauges, chokes, and/or other components installed as an assembly on a subsea wellhead. The subsea Christmas tree 140 is configured to provide a controllable interface between the wellbore 120 and production facilities (e.g., via the subsea pipeline 148). The various valves of the subsea Christmas tree 140 can be used for such purposes as testing, servicing, regulating, and/or choking the stream of produced subterranean resources 111 coming up from the wellbore 120.

The subsea manifold 142 is an assembly of headers, pipes (e.g., piping 188) and valves. The subsea manifold 142 is configured to transfer the subterranean resources 111 from the subsea Christmas to one or more of the subsea pipelines 148. In some ways, the subsea manifold 142 acts as a type of flow regulator to distribute the subterranean resource 111 among the various subsea pipelines 148. Similarly, if there are multiple wellbores 120, as from a common pad, the subsea manifold 142 can receive the subterranean resource 111 from one or more of those wellbores 120 and distribute the subterranean resource 111 to one or more of the subsea pipelines 148.

Each subsea pipeline 148 (also sometimes called a submarine pipeline 148) is a series of pipes, coupled end to end, that is laid at or near to the seabed 102. A subsea pipeline 148 moves the subterranean resource 111 from the area of the wellbore 120 to some other location, typically for a midstream process (e.g., oil refining, natural gas processing). The piping 188, also located subsea, can include multiple pipes, ducts, elbows, joints, sleeves, collars, and similar components that are coupled to each other (e.g., using coupling features such as mating threads) to establish a network for transporting the subterranean resource 111 from the subsea Christmas tree 140, through the subsea manifold 142, to one or more of the subsea pipelines 148. Each component of the piping 188 can have an appropriate size (e.g., inner diameter, outer diameter) and be made of an appropriate material (e.g., steel) to safely and efficiently handle the pressure, temperature, flow rate, and other characteristics of the subterranean resource 111 at the depth in the water 194.

Each communication link 105 can include wired (e.g., Class 1 electrical cables, electrical connectors, Power Line Carrier, RS485) and/or wireless (e.g., sound or pressure waves in the water 194, Wi-Fi, Zigbee, visible light communication, cellular networking, Bluetooth, Bluetooth Low Energy (BLE), ultrawide band (UWB), WirelessHART, ISA100) technology. A communication link 105 can transmit signals (e.g., communication signals, control signals, data) from one component (e.g., a controller) of the system 199 to another (e.g., a valve on the subsea Christmas tree 140).

Each power transfer link 187 can include one or more electrical conductors, which can be individual or part of one or more electrical cables. In some cases, as with inductive power, power can be transferred wirelessly using power transfer links 187. A power transfer link 187 can transmit power from one component (e.g., a battery, a generator) of the system 199 to another (e.g., a motor on the subsea manifold 142). Each power transfer link 187 can be sized (e.g., 12 gauge, 18 gauge, 4 gauge) in a manner suitable for the amount (e.g., 480V, 24V, 120V) and type (e.g., alternating current, direct current) of power transferred therethrough. In this case, the communication links 105 and the power transfer links 187 are in the form of electrical cables.

In many cases, the subterranean resource 111 is extracted from the subterranean formation 110 through the wellbore 120 at a relatively high pressure. In such cases, the pressure of the subterranean resource 111 needs to be lowered to within a range of acceptable values before the subterranean resource 111 can be delivered to and transported through the subsea pipeline 148. A common way to reduce the pressure of the subterranean resource 111 is to use a choke (a type of valve) at the Christmas tree 140 so that the subterranean resource 111 can safely be delivered to the subsea pipeline 148. As defined herein, the Christmas tree 140, the subsea manifold 142, the subsea pipelines 148, the piping 188, and other components (e.g., a subsea compressor, a subsea pump assembly, a subsea evaporator, a pigging device, a valve, an example subsea jumper) used in the system 199 to produce the subterranean resource 111 and positioned in the water 194 are referred to herein as subsea production system components 109.

Figure 2:
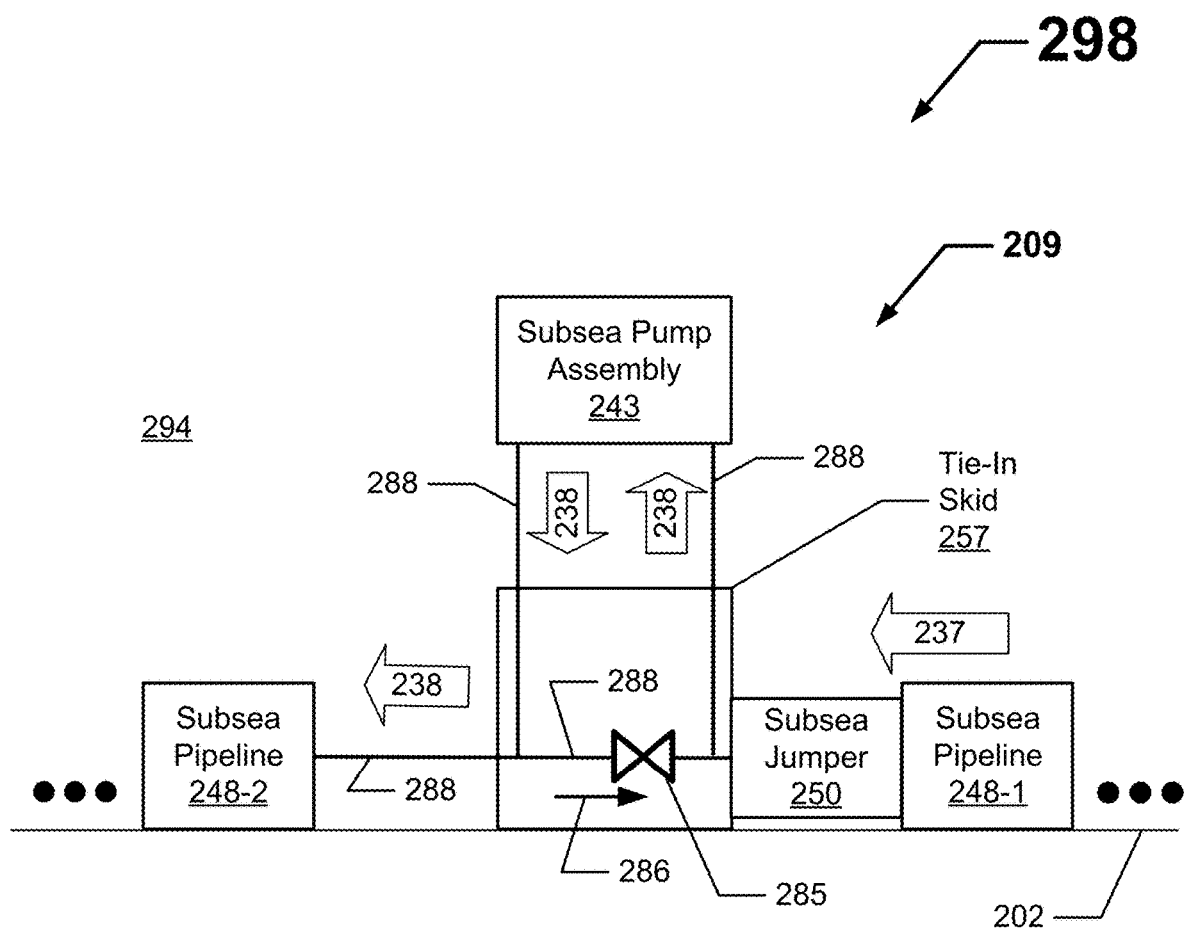
FIG. 2 shows a block diagram of part of a system used for producing and filtering a fluid subsea according to certain example embodiments.

FIG. 2 shows a block diagram of part of a system 298 used for producing and filtering a fluid subsea according to certain example embodiments. Referring to FIGS. 1 and 2, the part of the system 298 of FIG. 2 includes multiple subsea production system components 209 in the form of two segments of subsea pipeline 248 (subsea pipeline 248-1 and subsea pipeline 248-2), an example subsea jumper 250, a tie-in skid 257, a subsea pump assembly 243, and piping 288, all of which are located in water 294 (subsea) at or near the seabed 202. The subsea pipelines 248 and the piping 288 can be substantially the same as the subsea pipelines 148 and the piping 188 discussed above with respect to FIG. 1.

Some of the subsea production system components 209 of FIG. 2 transport a fluid in an unfiltered state 237 through the subsea pipeline 248-1 to the example subsea jumper 250. When the fluid passes through the subsea jumper 250 to the tie-in skid 257, the fluid is in a filtered state 238. The fluid in the filtered state 238 flows through the tie-in skid 257 to the subsea pump assembly 243 through piping 288. After the subsea pump assembly 243, the fluid in the filtered state 238 flows through more piping 288 back to the tie-in skid 257, then through additional piping 288 to the subsea pipeline 248-2.

The subsea pump assembly 243 is configured to circulate the fluid, whether the fluid is in an unfiltered state 237 or the fluid is in a filtered state 238, through the piping 288 to the subsea pipeline 248-2. The subsea pump assembly 243 can include one or more of a number of components. Examples of such components can include, but are not limited to, a pump, a motor, a shaft, a gear, an adjustable speed drive, and a housing. The subsea pump assembly 243 (or a portion thereof) can be integrated with the piping 288. Because the fluid in the unfiltered state 237 includes solids (e.g., rock, sand, fines), which can cause direct or indirect damage to portions (e.g., the pump impeller, the motor) of the subsea pump assembly 243, the longevity and reliability of the subsea system can be increased by placing the subsea jumper 250 upstream of the subsea pump assembly 243 so that the fluid in the filtered state 238 is received by the subsea pump assembly 243.

The tie-in skid 257 can serve as a base for a modular or building block approach to the subsea system. Specifically, the tie-in skid 257 can allow the subsea pump assembly 243 to be "plugged in" to the piping 288 at or near the seabed 202. The tie-in skid 257 can have any of a number of configurations. In some cases, a subsea system does not include a tie-in skid 257. In other cases, a subsea system can include multiple tie-in skids 257. When a subsea system includes a tie-in skid 257, any type (e.g., the subsea pump assembly 243, a subsea condenser, a subsea compressor, a subsea evaporator) of subsea production system component 209 can be coupled to the tie-in skid 257.

Figure 18A:
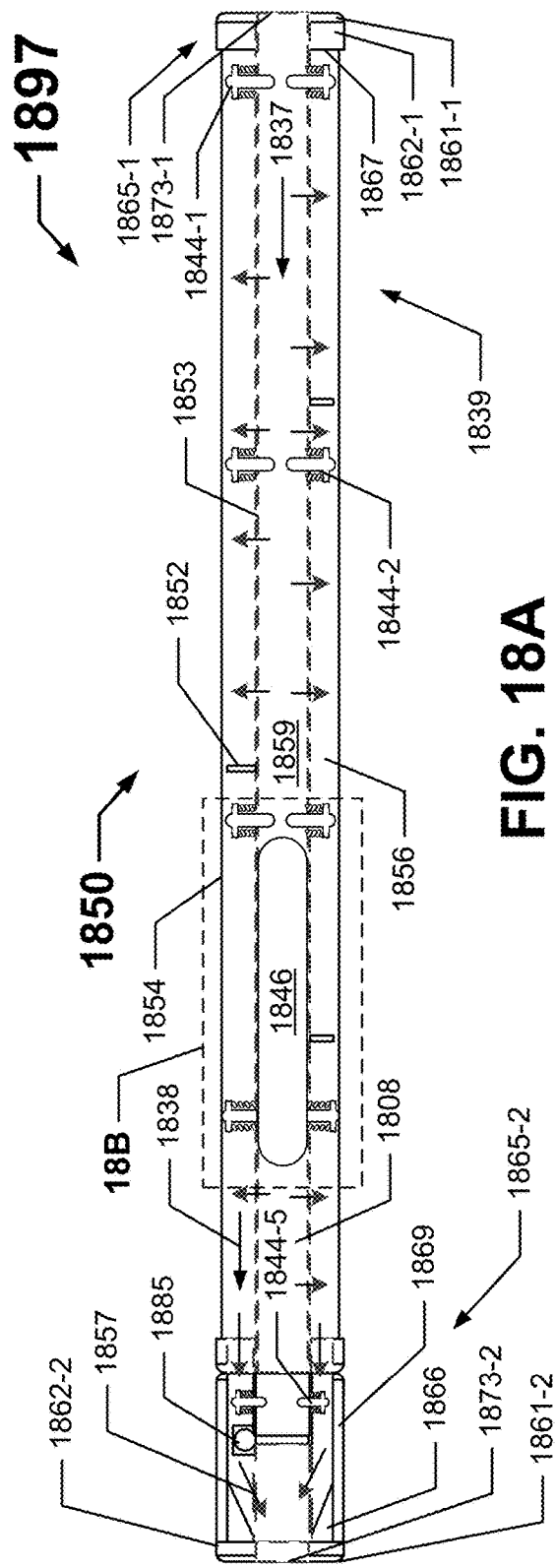
FIGS. 18A and 18B show another subassembly that includes a subsea jumper according to certain example embodiments.
Figure 18B:
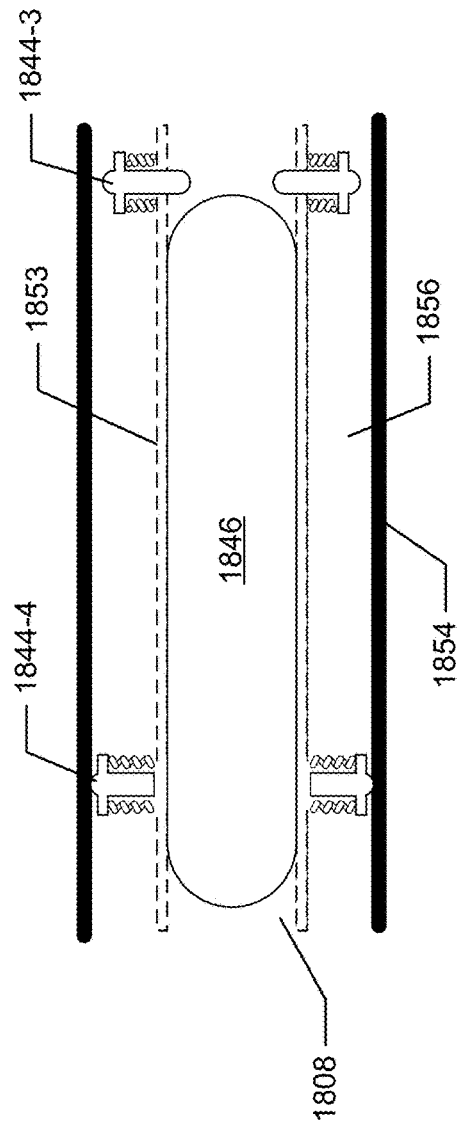

The tie-in skid 257 can also serve one or more other purposes aside from allowing for a modular or building block approach to a subsea system. For example, the tie-in skid 257 can provide a way to clean the example subsea jumper 250. In this case, the tie-in skid 257 includes a piggable line 286 that includes a valve 285 (e.g., a piggable check valve) to allow a pig to pass therethrough. The piggable line 286 can be in line with the piping 288 that is coupled to the outlet of the subsea jumper 250. In this way, a pig can travel from the piggable line 286, through the valve 285 in the tie-in skid 257, and into the subsea jumper 250 to clean at least a portion of the subsea jumper 250 while fluid in the unfiltered state 237 continues to flow into the subsea jumper 250 and fluid in the filtered state 238 continues to flow out of the subsea jumper 250. While in this example the system 298 is configured so that a pig enters and travels counter to the flow of the fluid, alternative embodiments, such as what is shown in FIGS. 18A and 18B below, can allow for the pig to travel in the direction of flow of the fluid.

The example subsea jumper 250 is configured to filter at least some of the solids in the fluid passing therethrough. In this way, the subsea jumper 250 can receive a fluid in an unfiltered state 237 (i.e., with solids), and the subsea jumper 250 can have flow therefrom the fluid in a filtered state 238 (i.e., absent at least some of the solids). The example subsea jumper 250 can have any of a number of configurations to filter out at least some of the solids from a fluid passing therethrough. Some configurations of the example subsea jumper 250 are shown below with respect to FIGS. 11A through 13B. In addition, flow to and/or through the subsea jumper 250 can vary, as shown by way of example in FIGS. 3 through 10 below.

As discussed above, the example subsea jumper 250 (or portions thereof) can be cleaned from time to time to remove some or all of the solids that have been filtered from the fluid. A cleaning mechanism can be internal (e.g., a flow alternating check valve located inside the subsea jumper 250) or external (e.g., a portion of the subsea jumper 250 is piggable) relative to the subsea jumper 250. A cleaning function can be performed while the subsea jumper 250 is online (e.g., the subsea jumper 250 has a fluid in an unfiltered state flowing into it and fluid in a filtered state flowing out of it) or offline (e.g., the subsea jumper 250 is bypassed or otherwise isolated from a flowing fluid in an unfiltered state). Other examples of cleaning functions and mechanisms for example subsea jumpers are discussed below with respect to FIGS. 4 through 13B.

Figure 3:
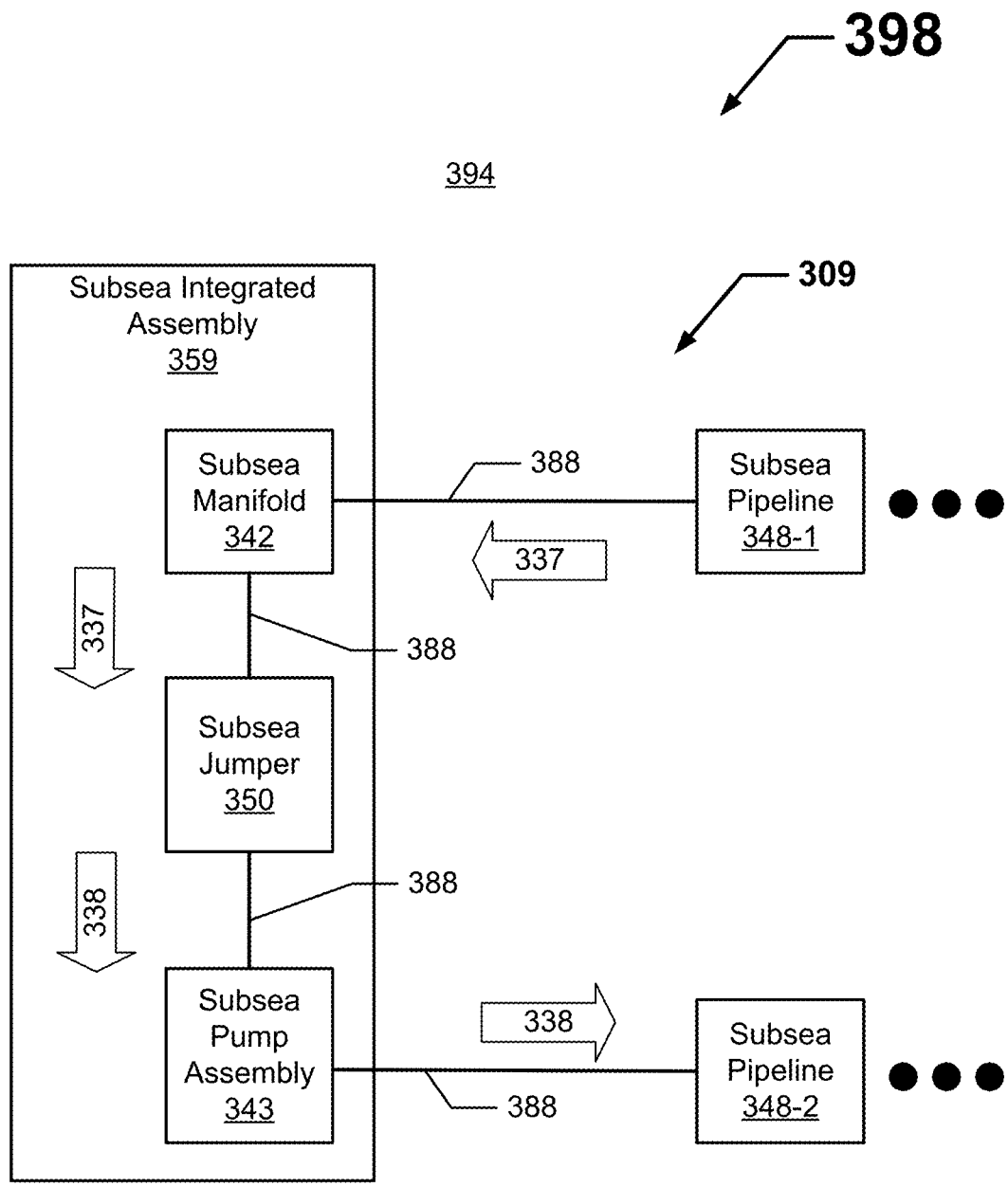
FIG. 3 shows a block diagram of part of another system for producing and filtering a fluid subsea according to certain example embodiments.

FIG. 3 shows a block diagram of part of another system 398 for producing and filtering a fluid subsea according to certain example embodiments. Referring to FIGS. 1 through 3, the part of the system 398 of FIG. 3 includes multiple subsea production system components 309 in the form of two segments of subsea pipeline 348 (subsea pipeline 348-1 and subsea pipeline 348-2), a subsea integrated assembly 359, and piping 388, all of which are located in water 394 (subsea). The subsea integrated assembly 359 in this case includes a subsea manifold 342, an example subsea jumper 350, a subsea pump assembly 343, and additional piping 388. The subsea pipelines 348, the subsea jumper 350, the subsea pump assembly 343, and the piping 388 can be substantially the same as the subsea pipelines, the subsea jumpers, the subsea pump assemblies, and the piping discussed above with respect to FIGS. 1 and 2.

In other cases, the subsea integrated assembly 359 can include one or more additional and/or alternative subsea production system components 309. The subsea integrated assembly 359 can be defined in any of a number of ways. For example, the subsea production system components 309 of the subsea integrated assembly 359 can be mounted on a common platform or skid. As another example, the subsea production system components 309 of the subsea integrated assembly 359 can be clustered at a common location (e.g., on the seabed) in the water 394.

Some of the subsea production system components 309 of FIG. 3 transport a fluid in an unfiltered state 337 through the subsea pipeline 348-1 and piping 388 to the subsea integrated assembly 359. Once the fluid in the unfiltered state 337 reaches the subsea integrated assembly 359, it flows through the subsea manifold 342 and additional piping 388 to the example subsea jumper 350, which filters the fluid to put the fluid in a filtered state 338. The fluid in the filtered state 338 leaves the subsea jumper 350 and flows through piping 388 to the subsea pump assembly 343 before leaving the subsea integrated assembly 359. From the subsea integrated assembly 359, the fluid in the filtered state 338 flows through piping 388 to subsea pipeline 348-2.

In alternative embodiments, the components of the arrangement of the subsea integrated assembly 359 shown in FIG. 3 can be altered without affecting operations or the filtering function. For example, the subsea jumper 350 of the subsea integrated assembly 359 can be placed upstream of the subsea manifold 342 of the subsea integrated assembly 359. As another example, the subsea jumper of the subsea integrated assembly 359 can be integrated with the piping 388 of the subsea integrated assembly 359 rather than be a stand-alone component.

Figure 4:
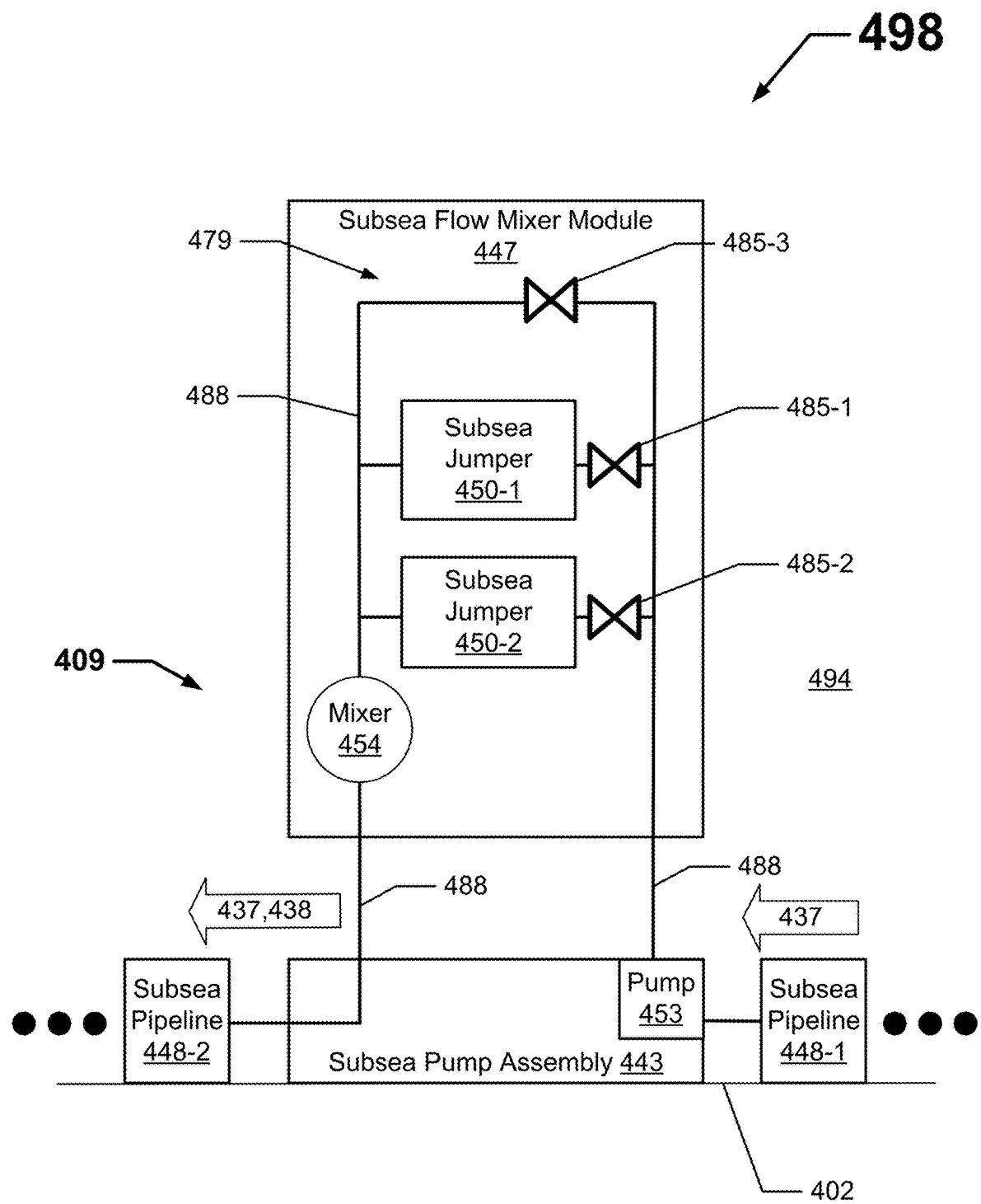
FIG. 4 shows a block diagram of part of yet another system for producing and filtering a fluid subsea according to certain example embodiments.

FIG. 4 shows a block diagram of part of yet another system 498 for producing and filtering a fluid subsea according to certain example embodiments. Referring to FIGS. 1 through 4, the part of the system 498 of FIG. 4 includes multiple subsea production system components 409 in the form of two segments of subsea pipeline 448 (subsea pipeline 448-1 and subsea pipeline 448-2), a subsea pump assembly 443, a subsea flow mixer module 447, and piping 488, all of which are located in water 494 (subsea). All of the subsea production system components 409 in this example are positioned on the seabed 402 except for the subsea flow mixer module 447. The subsea pump assembly 459 includes a pump 453.

The subsea flow mixer module 447 in this case includes a mixer 454, two example subsea jumpers 450 (subsea jumper 450-1 and subsea jumper 450-2), three valves 485 (valve 485-1, valve 485-2, and valve 485-3), and additional piping 488. The subsea pipelines 448, the subsea jumpers 450, the subsea pump assembly 443, and the piping 488 can be substantially the same as the subsea pipelines, the subsea jumpers, the subsea pump assemblies, and the piping discussed above with respect to FIGS. 1 through 3. The subsea flow mixer module 447 can be or include a formal structure that secures the mixer 454, the subsea jumpers 450, the valves 485, and the piping 488. Alternatively, the subsea flow mixer module 447 can be an informal grouping of the mixer 454, the subsea jumpers 450, the valves 485, and the piping 488.

Each valve 485 is integrated with piping 488 and is configured to control the flow of the fluid (both the fluid in the filtered state 438 and the fluid in the unfiltered state 437) flowing through the piping 488. A valve 485 can have one or more of any of a number of configurations, including but not limited to a choke valve, a guillotine valve, a check valve, a ball valve, a gate valve, a butterfly valve, a pinch valve, a needle valve, a plug valve, a diaphragm valve, and a globe valve. One valve 485 can be configured the same as or differently compared to another valve 485 in the system 498. If a valve 485 is controllable, that valve 485 can be controlled by a user, a controller, or some other component of an overall system, as discussed below with respect to FIG. 14. When there are multiple valves 485 in the system 498 that are controllable, one valve 485 can be controlled (e.g., manually by a user, automatically by a controller) the same or differently compared to how another valve 485 in the system 498 is controlled. When a valve 485 is described herein as being in a closed position or being closed, the valve 485 is fully closed, which prevents any fluid from flowing therethrough. When a valve 485 is described herein as being in an open position or being open, the valve 485 can be fully open or partially (e.g., 25%, 50%) open. As a result, when a valve 485 is in an open position or is open, some amount of fluid flows therethrough.

The mixer 454 is configured to agitate a fluid flowing through piping 488 and/or mix fluids flowing through multiple segments of piping 488 at a common piping 488 (e.g., a header, a manifold). In this case, the mixer 454 is positioned at the output of the subsea jumper 450-1, the output of the subsea jumper 450-2, and the distal end of the bypass line 479 within the subsea flow mixer module 447. The mixer 454 can include one or more components, including but not limited to a motor, an agitator, and a mixing vessel. The mixer 454 can operate using electrical power from a power source (e.g., a battery, a generator), which can be part of the mixer 454 or external to the mixer 454. The mixer 454 can agitate a fluid on a continuous basis or on a periodic basis. In some cases, the mixer 454 can have no moving parts.

Within the subsea flow mixer module 447, the subsea jumper 450-1 and the valve 485-1 are in series with each other, joined by piping 488, with the valve 485-1 positioned before the inlet of the subsea jumper 450-1. Similarly, the subsea jumper 450-2 and the valve 485-2 are in series with each other, joined by piping 488, with the valve 485-2 positioned before the inlet of the subsea jumper 450-2. The bypass line 479 includes a valve 485-3 placed in line with piping 488. The bypass line 479, the combination of the subsea jumper 450-1 and the valve 485-1, and the combination of the subsea jumper 450-2 and the valve 485-2 are in parallel with each other.

If the valve 485-2 and the valve 485-3 are closed and if the valve 485-1 is open, then the fluid in the unfiltered state 437 flows through the valve 485-1 and into the subsea jumper 450-1. When the fluid flows out of the subsea jumper 450-1, the fluid is in the filtered state 438 as it flows into the mixer 454, and then through piping 488 to the subsea pipeline 448-2. If the valve 485-1 and the valve 485-3 are closed and if the valve 485-2 is open, then the fluid in the unfiltered state 437 flows through the valve 485-2 and into the subsea jumper 450-2. When the fluid flows out of the subsea jumper 450-2, the fluid is in the filtered state 438 as it flows into the mixer 454, and then through piping 488 to the subsea pipeline 448-2.

If the valve 485-3 is closed and if the valve 485-1 and the valve 485-2 are open, then some of the fluid in the unfiltered state 437 flows through the valve 485-1 into the subsea jumper 450-1, and the remainder of the fluid in the unfiltered state 437 flows through the valve 485-2 into the subsea jumper 450-2. When the fluid flows out of the subsea jumper 450-1 and the subsea jumper 450-2, the fluid is in the filtered state 438 as it flows into the mixer 454, and then through piping 488 to the subsea pipeline 448-2.

If the valve 485-3 is open, then at least some of the fluid in the unfiltered state 437 remains in the unfiltered state as the fluid flows through the valve 485-3 and the rest of the bypass line 479, into the mixer 454, and then through piping 488 to the subsea pipeline 448-2. If the valve 485-1 and the valve 485-2 are closed when the valve 485-3 is open, then the subsea jumper 450-1 and the subsea jumper 450-2 are bypassed. When this occurs, cleaning and/or other maintenance can be performed on a subsea jumper 450. For example, the solids accumulated by the filter in the subsea jumper 450-1 and/or the subsea jumper 450-2 can be removed from the respective subsea jumper 450 without interrupting the flow of the fluid through the subsea flow mixer module 447. Such a configuration is useful when one or both of the subsea jumpers 450 are not piggable.

Figure 5:
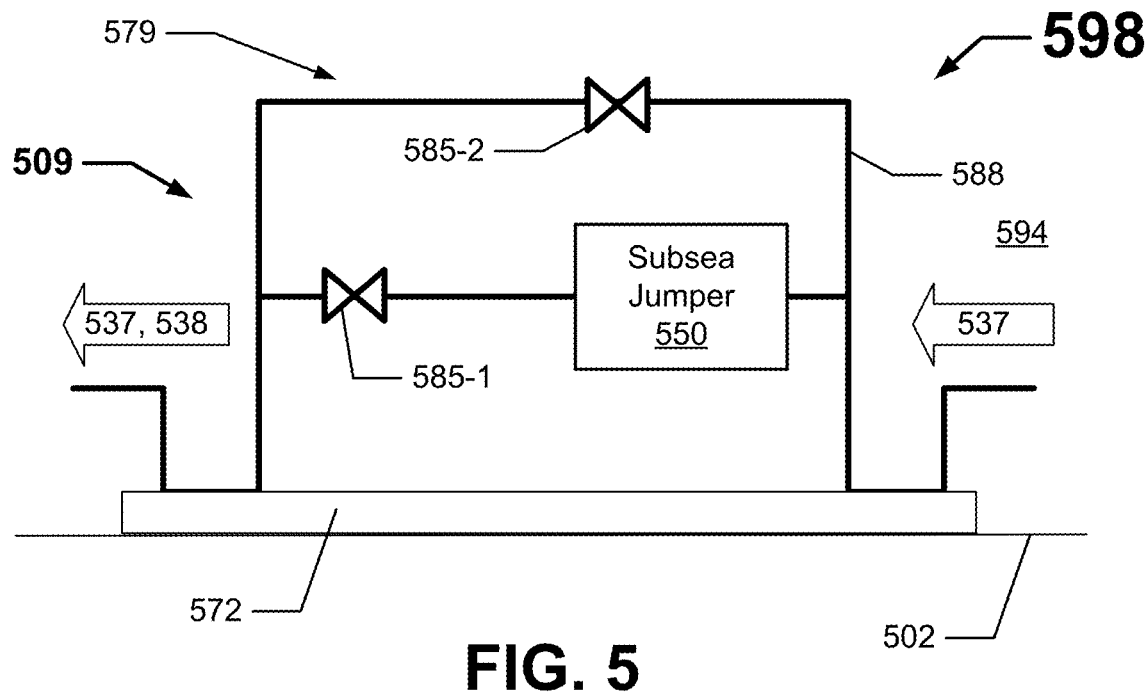
FIG. 5 shows a block diagram of part of still another system for producing and filtering a fluid subsea according to certain example embodiments.

FIG. 5 shows a block diagram of part of still another system 598 for producing and filtering a fluid subsea according to certain example embodiments. Referring to FIGS. 1 through 5, the part of the system 598 of FIG. 5 includes multiple subsea production system components 509 in the form of a subsea jumper 550, two valves 585 (valve 585-1 and valve 585-2), and piping 588. All of the subsea production system components 509 in the system 598 shown in FIG. 5 are under water 594 and are mounted on a platform 572, which is positioned on the seabed 502. The subsea jumper 550, the valves 585, and the piping 588 are substantially the same as the subsea jumpers, the valves, and the piping discussed above with respect to FIGS. 1 through 4.

The part of the system 598 of FIG. 5 is arranged such that the subsea jumper 550 and the valve 585-1 are in series with each other along with piping 588, and the combination of the subsea jumper 550 and the valve 585-1 is in parallel with the bypass line 579, which includes the valve 585-2 integrated with piping 588. If the valve 585-2 is closed and if the valve 585-1 is open, then the fluid in the unfiltered state 537 flows toward the platform 572 and into the subsea jumper 550. When the fluid flows out of the subsea jumper 550, the fluid is in the filtered state 538 and flows through the valve 585-1, through piping 588, and away from the platform 572. If the valve 585-2 is open, then at least some of the fluid in the unfiltered state 537 remains in the unfiltered state 537 as the fluid flows through the valve 585-2 and the rest of the bypass line 579, through piping 588, and away from the platform 572. If the valve 585-1 is closed when the valve 585-2 is open, then the subsea jumper 550 is bypassed. When this occurs, cleaning and/or other maintenance can be performed on the subsea jumper 550 in the absence of pigging capability.

Figure 6:
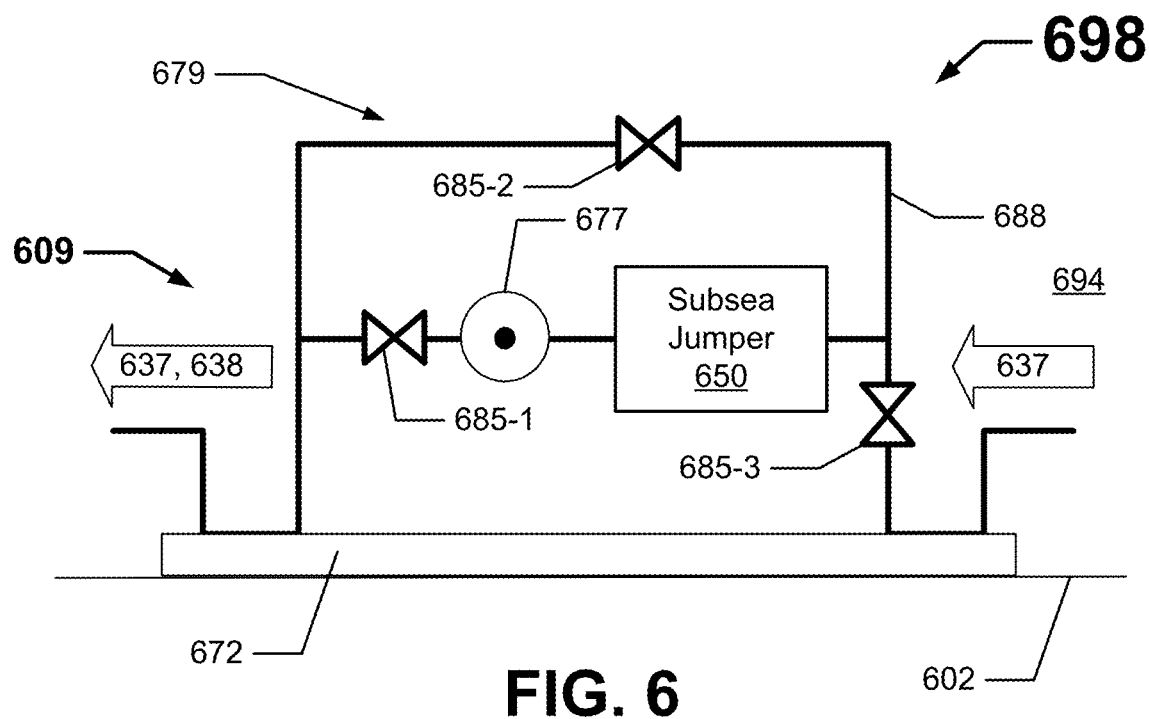
FIG. 6 shows a block diagram of part of yet another system for producing and filtering a fluid subsea according to certain example embodiments.

FIG. 6 shows a block diagram of part of yet another system 698 for producing and filtering a fluid subsea according to certain example embodiments. Referring to FIGS. 1 through 6, the part of the system 698 of FIG. 6 includes multiple subsea production system components 609 in the form of a subsea jumper 650, two valves 685 (valve 685-1 and valve 685-2), an access port 677, and piping 688. All of the subsea production system components 609 in the system 698 shown in FIG. 6 are under water 694 and are mounted on a platform 672, which is positioned on the seabed 602. The subsea jumper 650, the valves 685, and the piping 688 are substantially the same as the subsea jumpers, the valves, and the piping discussed above with respect to FIGS. 1 through 5.

The part of the system 698 of FIG. 6 is arranged substantially the same as the arrangement of the part of the system 598 of FIG. 5, except for the addition of the access port 677 in the system 698. Specifically, the subsea jumper 650 and the valve 685-1 are in series with each other along with piping 688, but in this case, the access port 677 is positioned in between the valve 685-1 and the subsea jumper 650. The combination of the subsea jumper 650, the access port 677, and the valve 685-1 is in parallel with the bypass line 679, which includes the valve 685-2 integrated with piping 688.

If the valve 685-2 is closed and if the valve 685-1 is open, then the fluid in the unfiltered state 637 flows toward the platform 672 and into the subsea jumper 650. When the fluid flows out of the subsea jumper 650, the fluid is in the filtered state 638 and flows past the access port 677, through the valve 685-1, through piping 688, and away from the platform 672. If the valve 685-2 is open, then at least some of the fluid in the unfiltered state 637 remains in the unfiltered state 637 as the fluid flows through the valve 685-2 and the rest of the bypass line 679, through piping 688, and away from the platform 672. If the valve 685-1 is closed when the valve 685-2 is open, then the subsea jumper 650 is bypassed. When this occurs, cleaning and/or other maintenance can be performed on the subsea jumper 650 by using the access port 677.

The access port 677 is configured to allow access therethrough so that the subsea jumper 650 can be accessed for some purpose (e.g., cleaning accumulated solids from the filter of the subsea jumper 650, changing the size of a filter to adjust for the size of solids that are filtered out of a fluid). The access port 677 can be accessed by a remotely operated vehicle (ROV), by a user with a tool, by a pigging device, and/or by some other entity. The access port 677 can be configured to receive the device or instrument to be used to clean, inspect, and/or maintain the subsea jumper 650. Depending on the configuration of the subsea jumper 650 and/or the system 698, the filter can be cleaned while fluid continues to flow through the subsea jumper 650 or when the subsea jumper 650 is isolated (e.g., bypassed) from the rest of the system 698 while production operations continue. The access port 677 can provide direct access to piping 688 that leads to the subsea jumper 650. Alternatively, the access port 677 can be integrated with the subsea jumper 650 to provide direct access to the subsea jumper 650. When the access port 677 is not being accessed, the access port 677 is configured to withstand the subsea environment (e.g., pressure, temperature) so that flow of the fluid through the piping 688 and the subsea jumper 650 is not affected.

Figure 7:
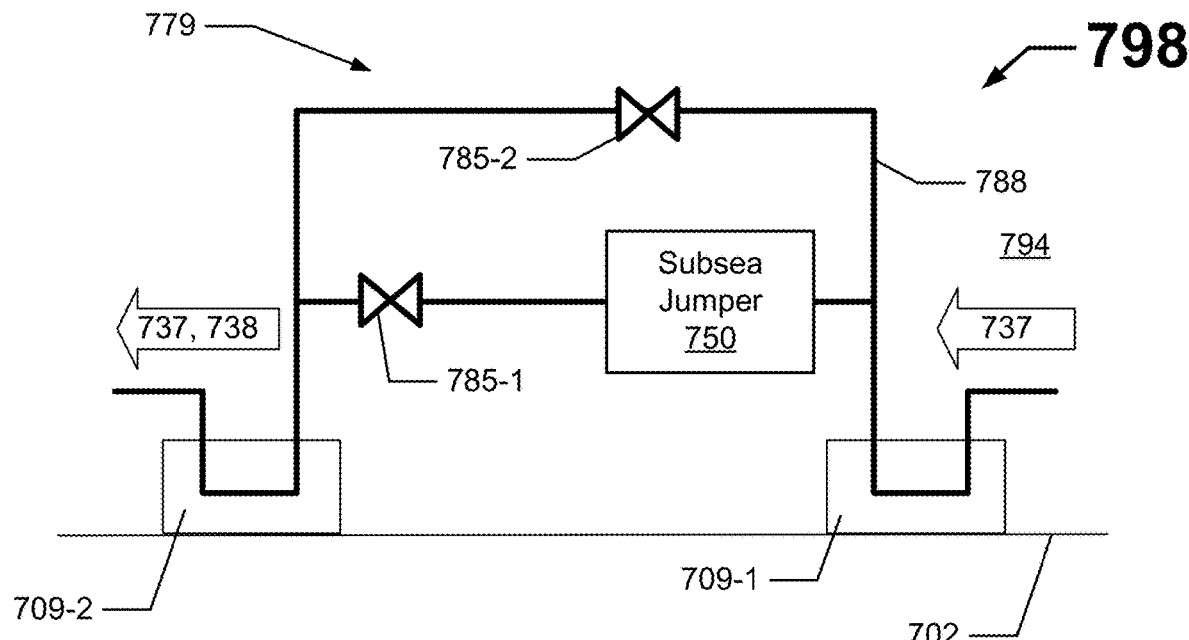
FIG. 7 shows a block diagram of part of still another system for producing and filtering a fluid subsea according to certain example embodiments.

FIG. 7 shows a block diagram of part of still another system for producing and filtering a fluid subsea according to certain example embodiments. Referring to FIGS. 1 through 7, the part of the system 798 of FIG. 7 is configured the same as the part of the system 598 of FIG. 5, except that two subsea production system components 709 (subsea production system component 709-1 and subsea production system component 709-2) of FIG. 7 have replaced the platform 572 of FIG. 5. As such, the part of the system 798 of FIG. 7 includes a subsea jumper 750, two valves 785 (valve 785-1 and valve 785-2), subsea production system component 709-1, subsea production system component 709-2, and piping 788.

The part of the system 798 shown in FIG. 7 is under water 794. The subsea production system component 709-1 and the subsea production system component 709-2 are positioned on the seabed 702. The subsea jumper 750, the valves 785, and the piping 788 are substantially the same as the subsea jumpers, the valves, and the piping discussed above with respect to FIGS. 1 through 6. The subsea production system component 709-1 and the subsea production system component 709-2 can be any active (e.g., a subsea pump assembly, a subsea manifold, a subsea pipeline) or passive (e.g., skid, platform) component of the system 798.

The part of the system 798 of FIG. 7 is arranged such that the subsea jumper 750 and the valve 785-1 are in series with each other along with piping 788, and the combination of the subsea jumper 750 and the valve 785-1 is in parallel with the bypass line 779, which includes the valve 785-2 integrated with piping 788. If the valve 785-2 is closed and if the valve 785-1 is open, then the fluid in the unfiltered state 737 flows through the subsea production system component 709-1 and into the subsea jumper 750. When the fluid flows out of the subsea jumper 750, the fluid is in the filtered state 738 and flows through the valve 785-1, through piping 788, and through the subsea production system component 709-2.

If the valve 785-2 is open, then at least some of the fluid in the unfiltered state 737 remains in the unfiltered state 737 as the fluid flows through the subsea production system component 709-1 and piping 788, through the valve 785-2 and the rest of the bypass line 779, and through other piping 788 and the subsea production system component 709-2. If the valve 785-1 is closed when the valve 785-2 is open, then the subsea jumper 750 is bypassed. When this occurs, cleaning and/or other maintenance can be performed on the subsea jumper 750 in the absence of pigging capability.

Figure 8:
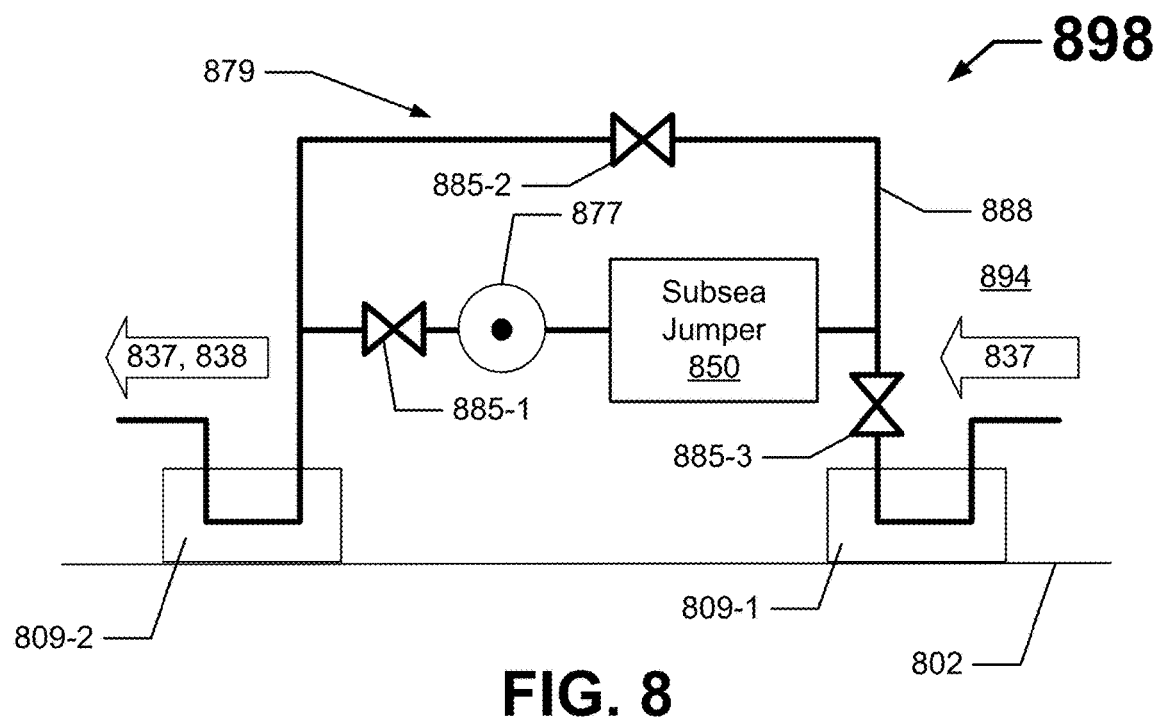
FIG. 8 shows a block diagram of part of yet another system for producing and filtering a fluid subsea according to certain example embodiments.

FIG. 8 shows a block diagram of part of yet another system 898 for producing and filtering a fluid subsea according to certain example embodiments. Referring to FIGS. 1 through 8, the part of the system 898 of FIG. 8 is configured the same as the part of the system 698 of FIG. 6, except that two subsea production system components 809 (subsea production system component 809-1 and subsea production system component 809-2) of FIG. 8 have replaced the platform 672 of FIG. 6. As such, the part of the system 898 of FIG. 8 includes a subsea jumper 850, two valves 885 (valve 885-1 and valve 885-2), an access port 877, the subsea production system component 809-1, the subsea production system component 809-2, and piping 888.

The part of the system 898 shown in FIG. 8 is under water 894. The subsea production system component 809-1 and the subsea production system component 809-2 are positioned on the seabed 802. The subsea jumper 850, the valves 885, the access port 877, and the piping 888 are substantially the same as the subsea jumpers, the valves, the access port, and the piping discussed above with respect to FIGS. 1 through 7. The subsea production system components 809 of FIG. 8 can be substantially the same as the subsea production system components 709 of FIG. 7.

The subsea jumper 850, the access port 877, and the valve 885-1 are in series with each other along with piping 888, with the access port 877 positioned between the valve 885-1 and the subsea jumper 850. The combination of the subsea jumper 850, the access port 877, and the valve 885-1 is in parallel with the bypass line 879, which includes the valve 885-2 integrated with piping 888. If the valve 885-2 is closed and if the valve 885-1 is open, then the fluid in the unfiltered state 837 flows through the subsea production system component 809-1 and piping 888 into the subsea jumper 850. When the fluid flows out of the subsea jumper 850, the fluid is in the filtered state 838 and flows past the access port 877, through the valve 885-1, through piping 888, and through the subsea production system component 809-2.

If the valve 885-2 is open, then at least some of the fluid in the unfiltered state 837 remains in the unfiltered state 837 as the fluid flows through the valve 885-2 and the rest of the bypass line 879, through piping 888, and through the subsea production system component 809-2. If the valve 885-1 is closed when the valve 885-2 is open, then the subsea jumper 850 is bypassed. When this occurs, cleaning and/or other maintenance can be performed on the subsea jumper 850 by using the access port 877.

Figure 9:
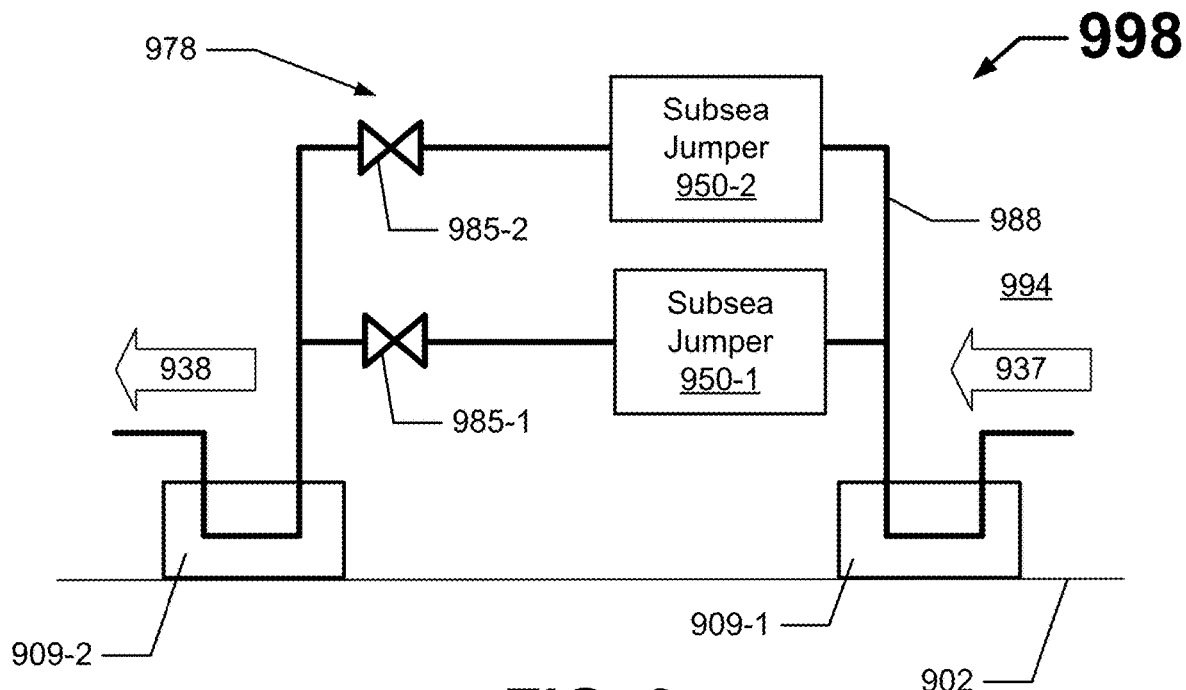
FIG. 9 shows a block diagram of part of still another system for producing and filtering a fluid subsea according to certain example embodiments.

FIG. 9 shows a block diagram of part of still another system 998 for producing and filtering a fluid subsea according to certain example embodiments. Referring to FIGS. 1 through 9, the part of the system 998 of FIG. 9 is configured the same as the part of the system 798 of FIG. 7, except that the system 998 includes an added subsea jumper 950. As such, the part of the system 998 of FIG. 9 includes two subsea jumpers 950 (subsea jumper 950-1 and subsea jumper 950-2), two valves 985 (valve 985-1 and valve 985-2), subsea production system component 909-1, subsea production system component 909-2, and piping 988.

The part of the system 998 shown in FIG. 9 is under water 994. The subsea production system component 909-1 and the subsea production system component 909-2 are positioned on the seabed 902. The subsea jumpers 950, the valves 985, and the piping 988 are substantially the same as the subsea jumpers, the valves, and the piping discussed above with respect to FIGS. 1 through 8. The subsea production system components 909 of FIG. 9 can be substantially the same as the subsea production system components of FIGS. 7 and 8.

The part of the system 998 of FIG. 9 is arranged such that the subsea jumper 950-1 and the valve 985-1 are in series with each other along with piping 988, and the combination of the subsea jumper 950-1 and the valve 985-1 is in parallel with the alternative flow path 978, which includes the subsea jumper 950-2 and the valve 985-2 in series with each other along with piping 988. If the valve 985-2 is closed and if the valve 985-1 is open, then the fluid in the unfiltered state 937 flows through the subsea production system component 909-1 and into the subsea jumper 950-1. When the fluid flows out of the subsea jumper 950-1, the fluid is in the filtered state 938 and flows through the valve 985-1, through piping 988, and through the subsea production system component 909-2.

If the valve 985-1 is closed and if the valve 985-2 is open, then the fluid in the unfiltered state 937 flows through the subsea production system component 909-1 and into the subsea jumper 950-2. When the fluid flows out of the subsea jumper 950-2, the fluid is in the filtered state 938 and flows through the valve 985-2, through piping 988, and through the subsea production system component 909-2. In this arrangement, any fluid flowing to the subsea production system component 909-2 is in a filtered state 938. Also, if a valve 985 (e.g., valve 985-2) is closed, then the corresponding subsea jumper 950 (e.g., subsea jumper 950-2) has no fluid flowing therethrough. When this occurs, cleaning and/or other maintenance can be performed on that subsea jumper 950 in the absence of pigging capability.

Figure 10:
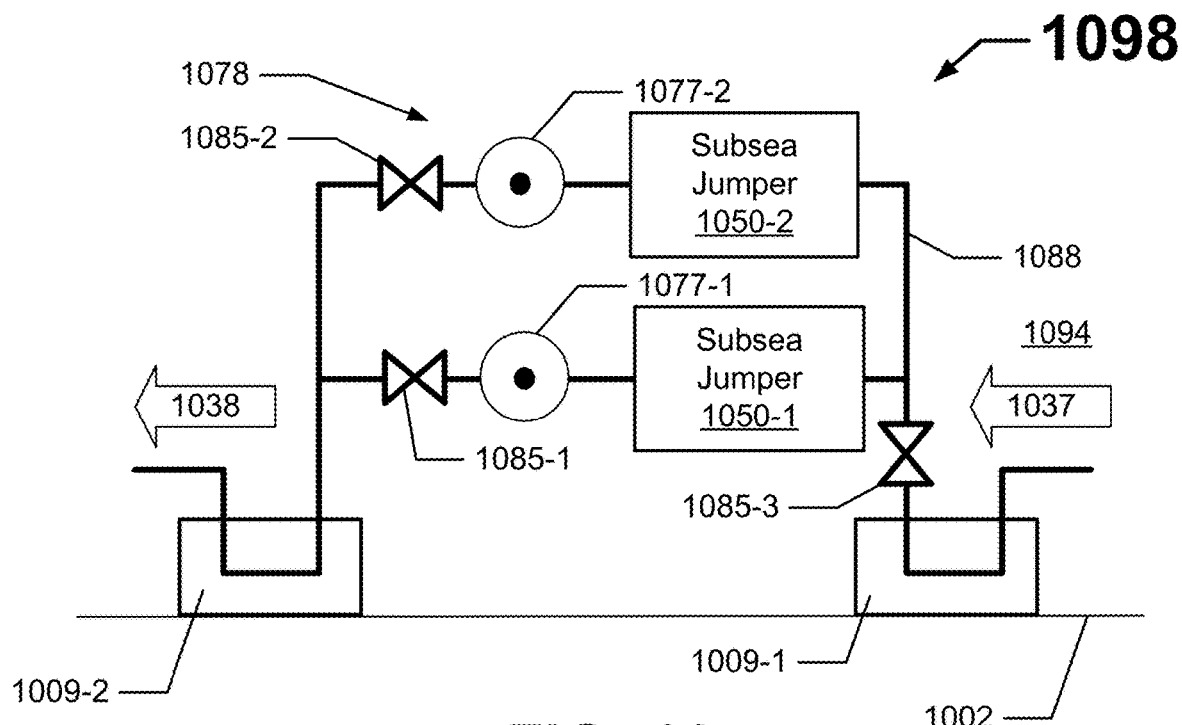
FIG. 10 shows a block diagram of part of yet another system for producing and filtering a fluid subsea according to certain example embodiments.

FIG. 10 shows a block diagram of part of yet another system 1098 for producing and filtering a fluid subsea according to certain example embodiments. Referring to FIGS. 1 through 10, the part of the system 1098 of FIG. 10 is configured the same as the part of the system 898 of FIG. 8, except that the system 1098 includes an added subsea jumper 1050 and an added access port 1077. As such, the part of the system 1098 of FIG. 10 includes two subsea jumpers 1050 (subsea jumper 1050-1 and subsea jumper 1050-2), two valves 1085 (valve 1085-1 and valve 1085-2), two access ports 1077 (access port 1077-1 and access port 1077-2), the subsea production system component 1009-1, the subsea production system component 1009-2, and piping 1088.

The part of the system 1098 shown in FIG. 10 is under water 1094. The subsea production system component 1009-1 and the subsea production system component 1009-2 are positioned on the seabed 1002. The subsea jumpers 1050, the valves 1085, the access ports 1077, and the piping 1088 are substantially the same as the subsea jumpers, the valves, the access ports, and the piping discussed above with respect to FIGS. 1 through 9. The subsea production system components 1009 of FIG. 10 can be substantially the same as the subsea production system components of FIGS. 7 through 9.

The subsea jumper 1050-1, the access port 1077-1, and the valve 1085-1 are in series with each other along with piping 1088, with the access port 1077-1 positioned between the valve 1085-1 and the subsea jumper 1050-1. The combination of the subsea jumper 1050-1, the access port 1077-1, and the valve 1085-1 is in parallel with an alternative flow path 1078, which includes the subsea jumper 1050-2, the access port 1077-2, and the valve 1085-2 in series with each other along with piping 1088. If the valve 1085-2 is closed and if the valve 1085-1 is open, then the fluid in the unfiltered state 1037 flows through the subsea production system component 1009-1 and piping 1088 into the subsea jumper 1050-1. When the fluid flows out of the subsea jumper 1050-1, the fluid is in the filtered state 1038 and flows past the access port 1077-1, through the valve 1085-1, through piping 1088, and through the subsea production system component 1009-2.

If the valve 1085-1 is closed and if the valve 1085-2 is open, then the fluid in the unfiltered state 1037 flows through the subsea production system component 1009-1 and piping 1088 into the subsea jumper 1050-2. When the fluid flows out of the subsea jumper 1050-2, the fluid is in the filtered state 1038 and flows past the access port 1077-2, through the valve 1085-2, through piping 1088, and through the subsea production system component 1009-2. In this arrangement, any fluid flowing to the subsea production system component 1009-2 is in a filtered state 1038. Also, if a valve 1085 (e.g., valve 1085-1) is closed, then the corresponding subsea jumper 1050 (e.g., subsea jumper 1050-1) has no fluid flowing therethrough. When this occurs, cleaning and/or other maintenance can be performed on that subsea jumper 1050 using the associated access port 1077 (e.g., access port 1077-1).

Figure 11A:
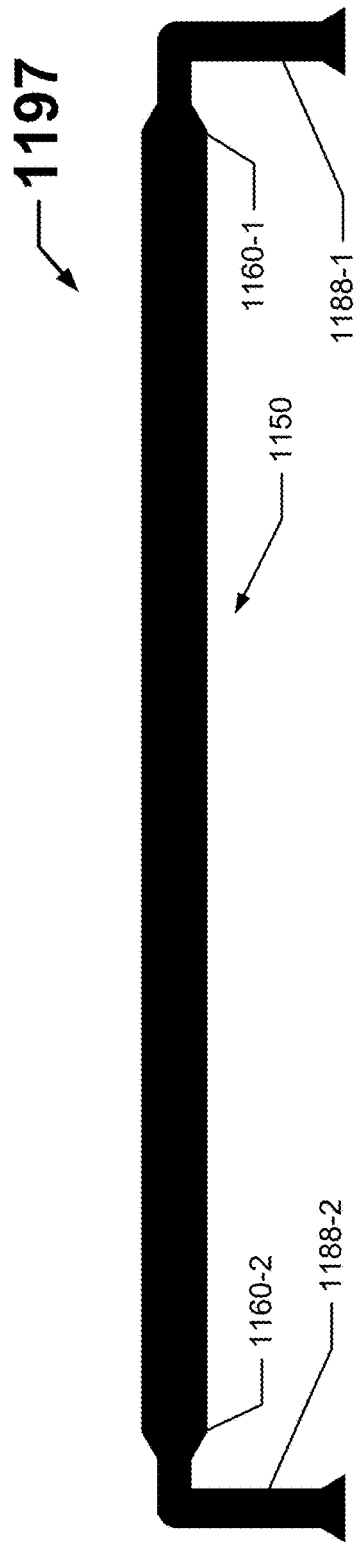
FIGS. 11A and 11B show a subassembly that includes a subsea jumper according to certain example embodiments.
Figure 11B:
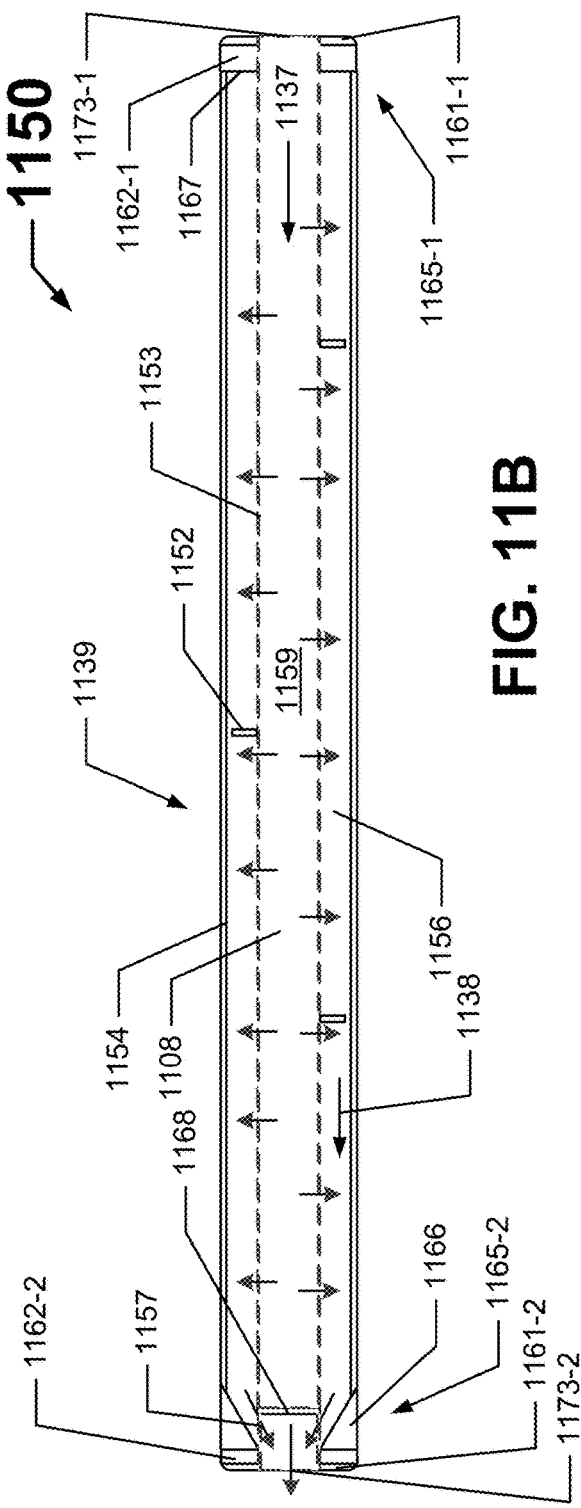

FIGS. 11A and 11B show a subassembly 1197 that includes a subsea jumper 1150 according to certain example embodiments. Specifically, FIG. 11A shows a side view of the subassembly 1197, and FIG. 11B shows a sectional side view of the subsea jumper 1150. Referring to FIGS. 1 through 11B, the subassembly 1197 shown in FIG. 11A includes the subsea jumper 1150, a sensor device 1160-1 at the inlet of the subsea jumper 1150, a sensor device 1160-2 at the outlet of the subsea jumper 1150, piping 1188-1 coupled to the inlet of the subsea jumper 1150, and piping 1188-2 coupled to the outlet of the subsea jumper 1150. The piping 1188-1 and the piping 1188-2 is substantially the same as the piping discussed above with respect to FIGS. 1 through 10.

As discussed above, the subsea jumper 1150 can have any of a number of configurations to achieve the result of filtering a fluid to convert the fluid from an unfiltered state 1137 as the fluid enters the subsea jumper 1150 to a filtered state 1138 as the fluid leaves the subsea jumper 1150. In this case, the subsea jumper 1150 has a housing 1139 that has a shape (e.g., cylindrical (as in this example), conical). The housing 1139 has a housing wall 1154 forming a cavity 1159. The housing 1139 has an upstream end and a downstream end that define a length of the housing 1139. The upstream end of the housing 1139 is configured to couple to another the piping 1188-1 (or some other subsea production system component). The downstream end of the housing 1139 is configured to couple to another subsea production system component (in this case, piping 1188-2).

The subsea jumper 1150 also includes a filter 1153 that is disposed within the cavity 1159. The filter 1153 can have substantially the same shape (e.g., cylindrical) or a different shape (e.g., conical) compared to the shape of the housing 1139. The filter 1153 can be disposed along some or all of the length of the housing 1139. The filter 1153 defines a first flow area 1108 and a second flow area 1156 within the cavity 1159. The upstream end of the housing 1139 is configured to receive a fluid in an unfiltered state 1137 from the piping 1188-1 (or some other subsea production system component) into the first flow area 1108 within the cavity 1159. The downstream end is configured to distribute the fluid in a filtered state 1138 from the second flow area 1156 in the cavity 1159 to the piping 1188-2 (or some other subsea production system component).

As discussed above, the difference between the fluid in the unfiltered state 1137 and the fluid in the filtered state 1138 is that some or all of the solids in the fluid in the unfiltered state 1137 are removed by the filter 1153 as the fluid passes through the filter 1153 from the first flow area 1108 to the second flow area 1156. In order to maintain the first flow area 1108 to the second flow area 1156 within the cavity 1159, the filter 1153 can be held in a substantially fixed position relative to the housing wall 1154 of the housing 1139. One or more of a number of features can be used to maintain a fixed position of the filter 1153 within the cavity 1159.

For example, in this case, multiple baffles 1152 can be positioned within the cavity 1159 at various points along the length of the housing 1139 and the filter 1153, where each baffle 1152 is coupled to the inner surface of the housing wall 1154 at one end (or side) of each baffle 1152 and to the outer surface of the filter 1153 at the other end (or side) of each baffle 1152. The characteristics (e.g., length, structure) of the baffles 1152, as well as the number and placement of the baffles 1152 within the cavity 1159, can serve multiple purposes, including holding the filter 1153 at a substantially fixed position within the cavity 1159 and not substantially inhibiting flow of the fluid in the first flow area 1108 and/or the second flow area 1156.

The filter 1153 can have any of a number of configurations and/or components. For example, the filter 1153 can be or include one or more screens (e.g., a mesh screen, a slotted screen). The filter 1153 can have a single layer or multiple layers. The filter 1153 can be configured to allow solids below a certain threshold size (e.g., 250 microns, 500 microns, 750 microns) to pass therethrough along with the liquids in the fluid, while preventing any solids at or above the threshold size from passing therethrough. In this example, the flow area 1108 receiving the fluid in the unfiltered state 1137 is surrounded by the flow area 1156 from which the fluid in the filtered state 1138 flows out of the subsea jumper 1150. In alternative embodiments, the subsea jumper 1150 can be reconfigured and/or the orientation of the subsea jumper can be reversed so that the flow area 1156 receives the fluid in the unfiltered state 1137 and so that the fluid in the filtered state 1138 flows out of the subsea jumper 1150 from the flow area 1108. In some cases, the filter 1153 can be adjustable and/or changed out over time so that the threshold size of solids filtered out of a fluid can change.

This feature can be used, for example, to adjust for changing downhole conditions and/or production requirements.

In certain example embodiments, the filter 1153 can have a distal wall 1168 that does not allow any of the fluid to pass therethrough. In this way, at the distal end (in this example, the downstream end) of the subsea jumper 1150, the wall 1168 serves as a barrier between flow area 1108 and flow area 1156. Depending on the configuration of the subsea jumper 1150, the filter 1153 can have a diameter that is substantially the same as the diameter of the piping 1188-1. In this way, the fluid in the unfiltered state 1137 can have the same flow rate flowing through the piping 1188-1 as it has flowing through the flow area 1108 of the subsea jumper 1150. As a result, given the configuration of the subsea jumper 1150 in this example, the housing wall 1154 of the housing 1139 is larger than the diameter of the piping 1188-1. In alternative embodiments, the diameter of the filter 1153 can be larger or smaller than the diameter of the piping 1188-1.

Adjacent to the distal end of the filter 1153 and the wall 1168, the flow area 1156 can have one or more features that differ from the remainder of the flow area 1156. For example, there can be one or more channels 1157 that draw in the outer perimeter of that part of the flow area 1156 as the inner perimeter of that part of the flow area 1156 is reduced or disappears. In alternative embodiments, the channels 1157 can expand the outer perimeter of that part of the flow area 1156. In yet other alternative embodiments, there are no channels 1157 or similar features.

In some cases, the subsea jumper 1150 can include one or two end caps 1165 coupled to and/or integrated with an end of the subsea jumper 1150. For example, as shown in FIG. 11B, an end cap 1165-2 can be coupled to one end (in this case, the downstream end) of the housing 1139 of the subsea jumper 1150, and another end cap 1165-1 can be coupled to the other end (in this case, the upstream end) of the housing 1139 of the subsea jumper 1150. Each end cap 1165 of the subsea jumper 1150 can perform one or more of a number of functions. Such functions can include, but are not limited to, act as a termination for the filter 1153, include one or more coupling features configured to directly or indirectly couple to an adjacent subsea production system component (in this case, piping 1188), act as at least part of a channel (e.g., channel 1157) to direct the flow of a fluid (whether in an unfiltered state 1137 or in a filtered state 1138) in a flow area (e.g., flow area 1156, flow area 1108), and include one or more ports for receiving one or more sensor devices (e.g., sensor devices 1160).

In this case, end cap 1165-1 includes an end plate 1161-1, a sensor device port 1162-1, and a distal wall 1167. All of these parts of the end cap 1165-1 fit over the filter 1153, leaving the flow area 1108 accessible (e.g., to piping 1188-1) through an aperture 1173-1 that traverses the center of the end cap 1165-1. The distal wall 1167 creates a non-passible barrier at the upstream end of the flow area 1156. The end plate 1161-1 of the end cap 1165-1 can include one or more coupling features that are configured to directly or indirectly couple to the piping 1188-1 (or other subsea production system component of the system). The sensor device port 1162-1 of the end cap 1165-1 is configured to receive or include one or more sensor devices 1160, where each sensor device 1160 is configured to measure one or more parameters (e.g., pressure, flow rate, strain, temperature, presence of sand).

End cap 1165-2 in this example includes an end plate 1161-2, a sensor device port 1162-2, and a transition feature 1166. All of these parts of the end cap 1165-2 fit over the filter 1153, leaving the flow area 1156 accessible (e.g., to piping 1188-2) through the end cap 1165-2. The transition feature 1166 helps form the one or more channels 1157 through which the fluid flows before leaving the subsea jumper 1150. In this case, the transition feature 1166 is a conically-shaped wall that helps funnel the fluid from the flow area 1156 to the aperture 1173-2 that traverses the center of the end cap 1165-2. The end plate 1161-2 of the end cap 1165-2 can include one or more coupling features that are configured to directly or indirectly couple to the piping 1188-2 (or other subsea production system component of the system). The sensor device port 1162-2 of the end cap 1165-2 is configured to receive or include one or more sensor devices 1160, where each sensor device 1160 is configured to measure the same or different parameters compared to the parameters measured by the sensor device 1160 received by or included with the sensor device port 1162-1 of end cap 1165-1.

Each sensor device 1160 (in this case, sensor device 1160-1 and sensor device 1160-2) of the subassembly 1197 includes one or more sensors that measure one or more parameters (e.g., pressure, flow rate, temperature, sand amount, fluid content, voltage, current, chemical elements in a fluid). Examples of a sensor of a sensor device 1160 can include, but are not limited to, a temperature sensor, a flow sensor, a pressure sensor, a gas spectrometer, a voltmeter, an ammeter, a permeability meter, a porosimeter, and a camera. A sensor device 1160 can measure a parameter associated with the fluid flowing through the subsea jumper 1150.

When a sensor device 1160 includes its own controller (e.g., controller 1404 in FIG. 14 below), or portions thereof, then the sensor device 1160 can be considered a type of computer device, as discussed below with respect to FIG. 16. When multiple sensor devices 1160 are used to measure the same parameter (e.g., a pressure, a temperature) at different locations along the subassembly 1197 or the subsea jumper 1150, a differential measurement of that parameter can be ascertained. In this example, sensor device 1160-1 is disposed in the sensor device port 1162-1 of the end cap 1165-1 of the subsea jumper 1150, and sensor device 1160-2 is disposed in the sensor device port 1162-2 of the end cap 1165-2 of the subsea jumper 1150.

FIGS. 12A and 12B show another subsea jumper 1250 according to certain example embodiments. Specifically, FIG. 12A shows a sectional side view of the subsea jumper 1250, and FIG. 12B shows a detailed sectional side view of the subsea jumper 1250. Referring to FIGS. 1A through 12B, the subsea jumper 1250 of FIGS. 12A and 12B includes a housing 1239, a filter 1253 disposed within the housing 1239, an end cap 1265-1, and another end cap 1265-2. The housing 1239, the filter 1253, the end cap 1265-1, and the end cap 1265-2 of the subsea jumper 1250 of FIGS. 12A and 12B can be substantially the same as the housing 1139, the filter 1153, the end cap 1165-1, and the end cap 1165-2 of FIGS. 11A and 11B, except as discussed below.

In this case, the housing 1239 is cylindrical and has a housing wall 1254 that forms a cavity 1259. The housing 1239 has an upstream end and a downstream end that define a length of the housing 1239. The upstream end of the housing 1239 is configured to couple to another subsea production system component (e.g., piping). The downstream end of the housing 1239 is configured to couple to another subsea production system component. The housing wall 1254 can have disposed therein one or more sensor device ports 1262. For example, in this case, the housing wall 1254 has disposed therein a sensor device port 1262-2 that receives sensor device 1260-2, which is configured to measure strain on the housing 1239.

The filter 1253 of the subsea jumper 1250 is also cylindrical in shape. The filter 1253 is disposed along most of the length of the housing 1239. The filter 1253 defines a flow area 1208 and a flow area 1256 within the cavity 1259. The upstream end of the housing 1239 is configured to receive a fluid in an unfiltered state 1237 from a subsea production system component into the flow area 1208 within the cavity 1259. The downstream end is configured to distribute the fluid in a filtered state 1238 from the flow area 1256 in the cavity 1259 to another subsea production system component. Multiple baffles 1252 are positioned within the cavity 1259 at various points along the length of the housing 1239 and the filter 1253, where each baffle 1252 is coupled to the inner surface of the housing wall 1254 at one end (or side) of each baffle 1252 and to the outer surface of the filter 1253 at the other end (or side) of each baffle 1252.

The filter 1253 has a distal wall 1268 that does not allow any of the fluid to pass therethrough. In this way, at the distal end (in this example, the downstream end) of the subsea jumper 1250, the wall 1268 serves as a barrier between flow area 1208 and flow area 1256. Adjacent to the distal end of the filter 1253 and the wall 1268, the flow area 1256 has one or more channels 1257 that draw in the outer perimeter of that part of the flow area 1256 as the inner perimeter of that part of the flow area 1256 is reduced or disappears.

The end cap 1265-2 in this case is coupled to one end (in this case, the downstream end) of the housing 1239 of the subsea jumper 1250, and the end cap 1265-1 is coupled to the other end (in this case, the upstream end) of the housing 1239 of the subsea jumper 1250. In this case, end cap 1265-1 includes an end plate 1261-1, a sensor device port 1262-1, and a distal wall 1267. All of these parts of the end cap 1265-1 fit over the filter 1253, leaving the flow area 1208 accessible (e.g., to piping) through an aperture 1273-1 that traverses the center of the end cap 1265-1. The distal wall 1267 creates a non-passible barrier at the upstream end of the flow area 1256. The end plate 1261-1 of the end cap 1265-1 can include one or more coupling features that are configured to directly or indirectly couple to another subsea production system component of the system. In this example, the sensor device port 1262-1 of the end cap 1265-1 receives sensor device 1260-1. In this case, the sensor device 1260-1 is configured to measure pressure.

End cap 1265-2 in this example includes an end plate 1261-2, a sensor device port 1262-3, and a transition feature 1266. All of these parts of the end cap 1265-2 fit over the filter 1253, leaving the flow area 1256 accessible (e.g., to piping) through the end cap 1265-2. The transition feature 1266 helps form the one or more channels 1257 through which the fluid flows before leaving the subsea jumper 1250. In this case, the transition feature 1266 is a conically-shaped wall that helps funnel the fluid from the flow area 1256 to the aperture 1273-2 that traverses the center of the end cap 1265-2. The end plate 1261-2 of the end cap 1265-2 can include one or more coupling features that are configured to directly or indirectly couple to another subsea production system component. The sensor device port 1262-3 of the end cap 1265-2 is receiving sensor device 1260-3, which is configured to measure pressure. In such a case, the measurements made by sensor device 1260-1 and sensor device 1260-3 can help determine a differential pressure across the length of the subsea jumper 1250.

The end cap 1265-2 can also include one or more features for regulating flow of the fluid in the flow area. In this case, the end cap 1265-2 includes a flow alternating check valve 1285 and a flow regulator 1275, both of which are within the flow area 1256. The flow regulator 1275 can be configured to restrict or stop the flow of the fluid in the filtered state 1238 if the pressure and/or the flow rate of the fluid drops below a threshold value. The flow regulator 1275 can have any of a number of different configurations. In this case, the flow regulator 1275 includes a base 1272, a stop 1276, a regulating device 1274, and a resilient device 1229 disposed between the regulating device 1274 and the base 1272. The base 1272 and the stop 1276 remain in a fixed position, with the base 1272 coupled to the outer surface of the inner wall (substantially planar with the filter 1253) of the end cap 1265-2, and with the stop 1276 coupled to the inner surface of the outer wall of the end cap 1265-2.

The resilient device 1229 of the flow regulator 1275 has a default position and a compressed position. In the default position, the resilient device 1229 is extended so that the regulating device 1274 makes firm contact against the stop 1276, effectively creating a seal between the stop 1276 and the regulating device 1274. At low flow rates and/or pressures of the fluid in the flow area 1256, the seal between the stop 1276 and the regulating device 1274 prevents the fluid in the filtered state 1238 from flowing through the flow regulator 1275. When the flow rate and/or pressure of the fluid in the flow area 1256 increases above a threshold amount, the force applied by the fluid against the regulating device 1274 compresses the resilient device 1229, which in turn creates a gap between the stop 1276 and the regulating device 1274. The fluid can then flow through the gap as long as the force applied by the fluid against the regulating device 1274 is above the threshold amount. Examples of a resilient device can include, but are not limited to, a compression spring, a pressure-activated hydraulic release mechanism, and a pressure-activated pneumatic release mechanism.

The valve 1285, located downstream of the flow regulator 1275 in this case, allows for flow reversal within the subsea jumper 1250 (or portion thereof) to blow out contaminants. For example, the valve 1285 is configured to activate a type of cleaning function (e.g., loosening or removing solids and/or other contaminants that accumulate) for the filter 1253 by allowing for reverse flow of fluid in the filtered state 1238 within the flow area 1208 relative to the direction of flow of the fluid in the unfiltered state 1237. Specifically, when the valve 1285 is triggered (e.g., by the passage of time, by a drop in pressure or flow rate (as measured by a sensor device) of the fluid, by the presence of a threshold amount of sand (as measured by a sensor device) in the fluid entering the flow area 1208), the valve 1285 directs some or all of the fluid in the flow area 1256 downstream of the flow regulator 1275 therethrough and into the distal end of the flow area 1208, creating counterflow with the fluid in the unfiltered state 1237 in the flow area 1208. When the valve 1285 is no longer activated (e.g., due to passage of time, the measurement made by a sensor device falling within a range of acceptable values), the valve 1285 closes, and the fluid flowing past the flow regulator 1275 in the flow area 1256 flows past the valve 1285 and exits the subsea jumper 1250.

FIGS. 13A and 13B show yet another subsea jumper 1350 according to certain example embodiments. Specifically, FIG. 13A shows a sectional side view of the subsea jumper 1350, and FIG. 13B shows a detailed sectional side view of the subsea jumper 1350. Referring to FIGS. 1A through 13B, the subsea jumper 1350 of FIGS. 13A and 13B includes a housing 1339, a filter 1353 disposed within the housing 1339, an end cap 1365-1, and another end cap 1365-2. The housing 1339, the filter 1353, the end cap 1365-1, and the end cap 1365-2 of the subsea jumper 1350 of FIGS. 13A and 13B can be substantially the same as the housings, the filters, and the end caps of FIGS. 11A through 12B, except as discussed below. In this case, the housing 1339 is cylindrical and has a housing wall 1354 that forms a cavity 1359. The housing 1339 has an upstream end and a downstream end that define a length of the housing 1339. The upstream end of the housing 1339 is configured to couple to another subsea production system component (e.g., piping). The downstream end of the housing 1339 is configured to couple to another subsea production system component.

The filter 1353 of the subsea jumper 1350 is also cylindrical in shape. The filter 1353 is disposed along most of the length of the housing 1339. The filter 1353 defines a flow area 1308 and a flow area 1356 within the cavity 1359. The upstream end of the housing 1339 is configured to receive a fluid in an unfiltered state 1337 from a subsea production system component into the flow area 1308 within the cavity 1359. The downstream end is configured to distribute the fluid in a filtered state 1338 from the flow area 1356 in the cavity 1359 to another subsea production system component. Multiple baffles 1352 are positioned within the cavity 1359 at various points along the length of the housing 1339 and the filter 1353, where each baffle 1352 is coupled to the inner surface of the housing wall 1354 at one end (or side) of each baffle 1352 and to the outer surface of the filter 1353 at the other end (or side) of each baffle 1352.

The filter 1353 has a distal wall 1368 that does not allow any of the fluid to pass therethrough. In this way, at the distal end (in this example, the downstream end) of the subsea jumper 1350, the wall 1368 serves as a barrier between flow area 1308 and flow area 1356. Adjacent to the distal end of the filter 1353 and the wall 1368, the flow area 1356 has one or more channels 1357 that draw in the outer perimeter of that part of the flow area 1356 as the inner perimeter of that part of the flow area 1356 is reduced or disappears.

The end cap 1365-2 in this case is coupled to one end (in this case, the downstream end) of the housing 1339 of the subsea jumper 1350, and the end cap 1365-1 is coupled to the other end (in this case, the upstream end) of the housing 1339 of the subsea jumper 1350. In this case, end cap 1365-1 includes an end plate 1361-1, a sensor device port 1362-1, and a distal wall 1367. All of these parts of the end cap 1365-1 fit over the filter 1353, leaving the flow area 1308 accessible (e.g., to piping) through an aperture 1373-1 that traverses the center of the end cap 1365-1. The distal wall 1367 creates a non-passible barrier at the upstream end of the flow area 1356. The end plate 1361-1 of the end cap 1365-1 can include one or more coupling features that are configured to directly or indirectly couple to another subsea production system component of the system. In this example, the sensor device port 1362-1 of the end cap 1365-1 is configured to receive a sensor device that is configured to measure one or more parameters.

End cap 1365-2 in this example includes an end plate 1361-2, a sensor device port 1362-3, a transition feature 1366, a flow alternating check valve 1385, and a flow regulator 1375, all of which are substantially the same as the sensor device port 1262-3, the transition feature 1266, the flow alternating check valve 1285, and the flow regulator 1275 of the end cap 1265-2 of the subsea jumper 1250 of FIGS. 12A and 12B. For example, the transition feature 1366 is a conically-shaped wall that helps funnel the fluid from the flow area 1356 to the aperture 1373-2 that traverses the center of the end cap 1365-2. The end plate 1361-2 of the end cap 1365-2 can include one or more coupling features that are configured to directly or indirectly couple to another subsea production system component. The sensor device port 1362-3 of the end cap 1365-2 is configured to receive a sensor device that is configured to measure one or more parameters.

The flow regulator 1375 of the end cap 1365-2 includes a base 1372, a stop 1376, a regulating device 1374, and a resilient device 1329 disposed between the regulating device 1374 and the base 1372. The base 1372 and the stop 1376 remain in a fixed position, with the base 1372 coupled to the outer surface of the inner wall (substantially planar with the filter 1353) of the end cap 1365-2, and with the stop 1376 coupled to the inner surface of the outer wall of the end cap 1365-2. The resilient device 1329 of the flow regulator 1375 has a default position and a compressed position. In the default position, the resilient device 1329 is extended so that the regulating device 1374 makes firm contact against the stop 1376, effectively creating a seal between the stop 1376 and the regulating device 1374.

At low flow rates and/or pressures of the fluid in the flow area 1356, the seal between the stop 1376 and the regulating device 1374 prevents the fluid in the filtered state 1338 from flowing through the flow regulator 1375. When the flow rate and/or pressure of the fluid in the flow area 1356 increases above a threshold amount, the force applied by the fluid against the regulating device 1374 compresses the resilient device 1329, which in turn creates a gap between the stop 1376 and the regulating device 1374. The fluid can then flow through the gap as long as the force applied by the fluid against the regulating device 1374 is above the threshold amount.

The flow alternating check valve 1385, located downstream of the flow regulator 1375, is configured to activate a type of cleaning function (e.g., loosening or removing solids and/or other contaminants that accumulate) for the filter 1353. When the valve 1385 is triggered, the valve 1385 directs some or all of the fluid in the flow area 1356 downstream of the flow regulator 1375 therethrough and into the distal end of the flow area 1308, creating counter-flow with the fluid in the unfiltered state 1337 in the flow area 1308. When the valve 1385 is no longer activated, the valve 1385 closes, and the fluid flowing past the flow regulator 1375 in the flow area 1356 exits the subsea jumper 1350.

Figure 14:
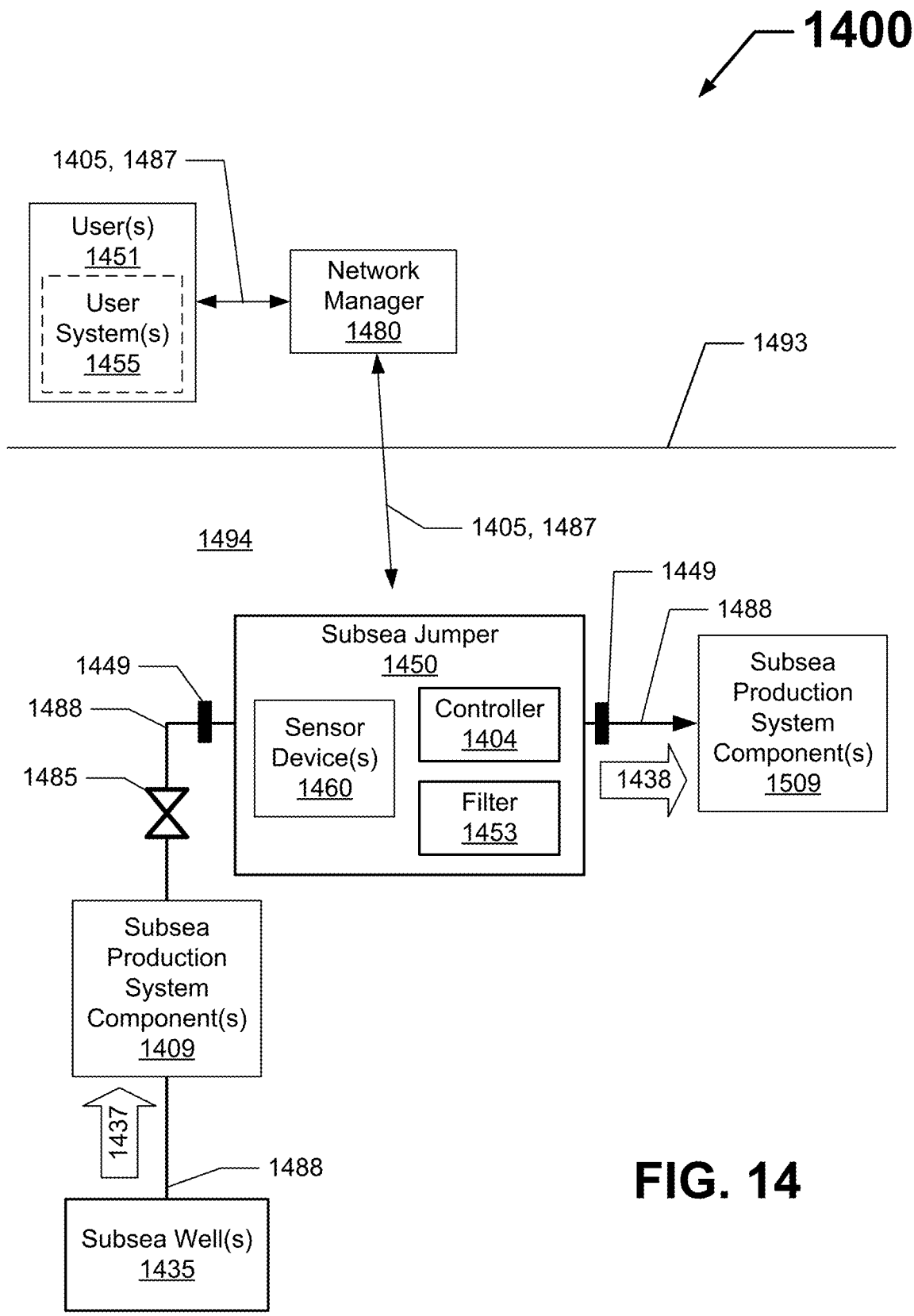
FIG. 14 shows a system for producing and filtering a fluid subsea according to certain example embodiments.

FIG. 14 shows a system 1400 for producing and filtering a fluid subsea according to certain example embodiments. Referring to FIGS. 1 through 14, the system 1400 of FIG. 4 includes one or more subsea wells 1435, one or more subsea production system components 1409, one or more subsea production system components 1509, at least example one subsea jumper 1450, one or more users 1451 (including one or more optional user systems 1455), a network manager 1480, piping 1488, and one or more valves 1485. The subsea jumpers 1450, the subsea production system components 1409, the subsea production system components 1509, the piping 1488, and the valves 1485 are under water 1494. The subsea jumper 1450 can include a filter 1453, one or more controllers 1404, and one or more sensor devices 1460. The subsea production system components 1409, the subsea production system components 1509, and the piping 1488 can be substantially the same as the subsea production system components and the piping discussed above with respect to FIGS. 1 through 13B.

The components shown in FIG. 14 are not exhaustive, and in some embodiments, one or more of the components shown in FIG. 14 may not be included in the example system 1400. Any component of the system 1400 can be discrete or combined with one or more other components of the system 1400. Also, one or more components of the system 1400 can have different configurations. For example, one or more sensor devices 1460 can be disposed above the water line 1493 or integrated with one or more subsea production system components 1409 rather than be part of a subsea jumper 1450. As another example, the system 1400 can include one or more controllers 1404, where a controller 1404 can be a stand-alone device, can be part of one or more other subsea production system components 1409 (e.g., a subsea manifold, a subsea Christmas tree) of the system 1400, can be part of one or more other subsea production system components 1509, and/or can be located above the water line 493.

In some cases, the users 1451 (including the associated user systems 1455), one or more controllers 1404, and the network manager 1480 can be located on the topsides (e.g., topsides 107) of a floating structure (e.g., floating structure 103) or a land-based structure (e.g., land-based structure 103). In addition, or in the alternative, one or more users 1451 (including any associated user system 1455), one or more controllers 1404, and/or the network manager 1480 can be located elsewhere (e.g., on land, in the water 1494).

A user 1451 can be any person that interacts, directly or indirectly, with the network manager 1480 and/or any other component of the system 1400. Examples of a user 1451 may include, but are not limited to, a business owner, an engineer, a company representative, a geologist, a consultant, a contractor, and a manufacturer's representative. A user 1451 can use one or more user systems 1455, which may include a display (e.g., a GUI). A user system 1455 of a user 1451 can interact with (e.g., send data to, obtain data from) the network manager 1480 via an application interface and using the communication links 1405. The user 1451 can also interact directly with the network manager 1480 through a user interface (e.g., keyboard, mouse, touchscreen).

A user system 1455 of a user 1451 interacts with (e.g., sends data to, receives data from) the network manager 1480 via an application interface (discussed below with respect to FIG. 15). Examples of a user system 1455 can include, but are not limited to, a cell phone with an app, a laptop computer, a handheld device, a smart watch, a desktop computer, and an electronic tablet. In some cases, a user 1451 (including an associated user system 1455) can also interact with one or more controllers 1404 and/or one or more of the sensor devices 1460 in the system 1400 using one or more communication links 1405.

The network manager 1480 is a device or component that controls all or a portion (e.g., a communication network, the controller 1404) of the system 1400. The network manager 1480 can be substantially similar to the controller 1404, discussed below. For example, the network manager 1480 can include a controller that has one or more components and/or similar functionality to some or all of the controller 1404. Alternatively, the network manager 1480 can include one or more of a number of features in addition to, or altered from, the features of the controller 1404. As described herein, control and/or communication with the network manager 1480 can include communicating with one or more other components of the same system 1400 or another system. In such a case, the network manager 1480 can facilitate such control and/or communication. The network manager 1480 can be called by other names, including but not limited to a master controller, a network controller, and an enterprise manager. The network manager 1480 can be considered a type of computer device, as discussed below with respect to FIG. 16.

The system 1400 can include one or more controllers 1404. A controller 1404 of the system 1400 communicates with and in some cases controls one or more of the other components (e.g., a sensor device 1460, an operator for a valve 1485, a subsea jumper 1450) of the system 1400. A controller 1404 performs a number of functions that include obtaining and sending data, evaluating data, following protocols, running algorithms, and sending commands. A controller 1404 can include one or more of a number of components. As discussed below with respect to FIG. 15, such components of a controller 1404 can include, but are not limited to, a control engine, a communication module, a timer, a counter, a power module, a storage repository, a hardware processor, memory, a transceiver, an application interface, and a security module. When there are multiple controllers 1404 (e.g., one controller 1404 for a subsea jumper 1450, another controller 1404 for a subsea production system component 1409, yet another controller 1404 for a subsea production system component 1509), each controller 1404 can operate independently of each other. Alternatively, one or more of the controllers 1404 can work cooperatively with each other. As yet another alternative, one of the controllers 1404 can control some or all of one or more other controllers 1404 in the system 1400. Each controller 1404 can be considered a type of computer device, as discussed below with respect to FIG. 16.

Each sensor device 1460 includes one or more sensors that measure one or more parameters (e.g., pressure, flow rate, temperature, humidity, fluid content, voltage, current, chemical elements in a fluid, chemical elements in a solid). Examples of a sensor of a sensor device 1460 can include, but are not limited to, a temperature sensor, a flow sensor, a pressure sensor, a gas spectrometer, a sand detector, a strain gauge, a voltmeter, an ammeter, a permeability meter, a porosimeter, and a camera. A sensor device 1460 can be integrated with or measure a parameter associated with one or more components of the system 1400. For example, a sensor device 1460 can be configured to measure a parameter (e.g., flow rate, pressure, temperature) of a subsea jumper 1450 and/or a fluid (e.g., subterranean resource 111), whether in an unfiltered state 1437 or a filtered state 1438.

As another example, a sensor device 1460 can be configured to determine how open or closed a valve 1485 within the system 1400 is. In some cases, a number of sensor devices 1460, each measuring a different parameter, can be used in combination to determine and confirm whether a controller 1404 should take a particular action (e.g., operate a valve 1485, operate or adjust the operation of a subsea jumper 1450, perform a function to clean the filter 1453 of a subsea jumper 1450). When a sensor device 1460 includes its own controller (e.g., controller 1404), or portions thereof, then the sensor device 1460 can be considered a type of computer device, as discussed below with respect to FIG. 16.

A subsea well 1435 has extracted therefrom a fluid (e.g., a subterranean resource 111) in an unfiltered state 1437. When there are multiple subsea wells 1435, some or all of the subsea wells 1435 can be developed as part of a common pad. As discussed above, the one or more subsea production system components 1409 and the one or more subsea production system components 1509 can be any equipment or subsystems that are located in the water 1494 and used to transport or facilitate the transportation of the fluid extracted from the subsea wells 1435. Examples of subsea production system components can include, but are not limited to, subsea pumps, subsea valves 1484, subsea piping 1488, subsea compressors, subsea evaporators, subsea generators, subsea manifolds, subsea Christmas trees, and traditional subsea jumpers currently known in the art that do not have filtering capability.

The system 1400 can include one or more example subsea jumpers 1450, where a subsea jumper 1450 is positioned between two subsea production system components 1409, 1509, as shown in FIG. 14. Alternatively, a subsea jumper 1450 can be integrated with a subsea production component 1409, 1509. When the system 1400 has only one example subsea jumper 1450 or for the first (most upstream) of a number of example subsea jumpers 1450 in a system, a subsea jumper 1450 receives a fluid in an unfiltered state 1437, and the fluid leaves the subsea jumper 1450 in a filtered state 1438. When the system 1400 has multiple subsea jumpers 1450, The fluid in the filtered state 1438 that exits an upstream subsea jumper 1450 becomes a fluid in the unfiltered state 1437 for a downstream subsea jumper 1450.

A subsea jumper 1450 can be inserted into and/or removed from the system 1400 using one or more disconnects 249. Each disconnect 249 is designed to allow for the associated piping 1488 to be sealed (closed) when a subsea jumper 250 is removed from the system 1400 and open when a subsea jumper 250 is connected to the system 1400. A disconnect 1449 can be operated manually (e.g., by a user 1451, by a ROV) or remotely (e.g., using a controller 1404). Such disconnects 1449 can be used in conjunction with, or independently of, one or more of the valves 1485. If a subsea jumper 250 is removed, the fluid remains in the unfiltered state 237 (or in a filtered state 238 if there is at least one upstream subsea jumper 1450).

Communication between the network manager 1480, the users 1451 (including any associated user systems 1455), the controller 1404, the subsea production system components 1409, the subsea production system components 1509, the sensor devices 1460, the valves 1485, and any other components of the system 1400 can be facilitated using the communication links 1405, which are substantially the same as the communication links 105 discussed above with respect to FIG. 1. Similarly, the transfer of power between any two components of the system 1400 can be facilitated using power transfer links 1487, which are substantially the same as the power transfer links 187 discussed above with respect to FIG. 1.

Figure 15:
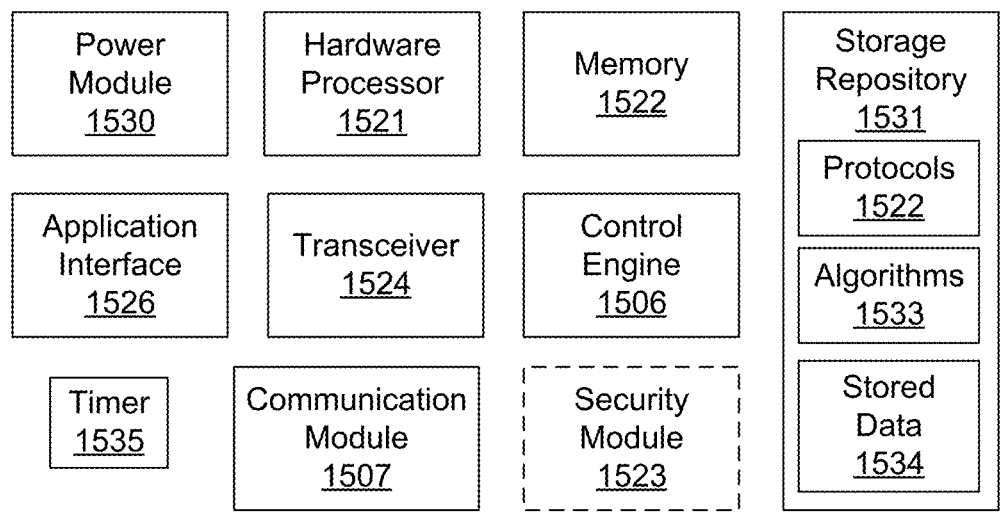
FIG. 15 shows a block diagram of a controller of the system of FIG. 14.

FIG. 15 shows a system diagram of the controller 1404 of the system 1400 of FIG. 14. Referring to FIGS. 1 through 15, the controller 1404 of FIG. 15 can include multiple components. In this case, the controller 1404 of FIG. 15 includes a control engine 1506, a communication module 1507, a timer 1535, a power module 1530, a storage repository 1531, a hardware processor 1521, a memory 1522, a transceiver 1524, an application interface 1526, and, optionally, a security module 1523. The controller 1404 (or components thereof) can be located at or near the various components of the system 1400. In addition, or in the alternative, the controller 1404 (or components thereof) can be located remotely from (e.g., in the cloud, at an office building) the various components of a system.

The storage repository 1531 can be a persistent storage device (or set of devices) that stores software and data used to assist the controller 1404 in communicating with one or more other components of a system, such as the users 1451 (including associated user systems 1455), the subsea production system components 1409, the subsea production system components 1509, the network manager 1480, and the sensor devices 1460 of the system 1400 of FIG. 14. In one or more example embodiments, the storage repository 1531 stores one or more protocols 1532, algorithms 1533, and stored data 1534.

The protocols 1532 of the storage repository 1531 can be any procedures (e.g., a series of method steps) and/or other similar operational processes that the control engine 1506 of the controller 1404 follows based on certain conditions at a point in time. The protocols 1532 can include any of a number of communication protocols that are used to send and/or obtain data between the controller 1404 and other components of the system 1400. Such protocols 1532 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 1532 can provide a layer of security to the data transferred within the system 1400. Other protocols 1532 used for communication can be associated with the use of Wi-Fi, Zigbee, visible light communication (VLC), cellular networking, BLE, UWB, and Bluetooth.

The algorithms 1533 can be any formulas, mathematical models, forecasts, simulations, and/or other similar tools that the control engine 1506 of the controller 1404 uses to reach a computational conclusion. For example, one or more algorithms 1533 can be used, in conjunction with one or more protocols 1532, to assist the controller 1404 to determine when to initiate a cleaning process of the filter 1453 of a subsea jumper 1450 and/or to evaluate a cleaning process on the filter 1453 of a subsea jumper 1450. As another example, one or more algorithms 1533 can be used, in conjunction with one or more protocols 1532, to assist the controller 1404 to receive measurements made by one or more sensor devices 1460 and use those measurements to assess the system 1400 (or components thereof) in real time.

Stored data 1534 can be any data associated with a field (e.g., the subterranean formation 110, the subterranean resource 111, the subsea wells 1435), other fields (e.g., other wellbores and subterranean formations), the other components (e.g., the user systems 1455, the subsea production system components 1409, the subsea production system components 1509), including associated equipment (e.g., motors, pumps, compressors), of the system 1400, measurements made by the sensor devices 1460, threshold values, tables, results of previously run or calculated algorithms 1533, updates to protocols 1532, user preferences, and/or any other suitable data. Such data can be any type of data, including but not limited to historical data, present data, and future data (e.g., forecasts). The stored data 1534 can be associated with some measurement of time derived, for example, from the timer 1535.

Examples of a storage repository 1531 can include, but are not limited to, a database (or a number of databases), a file system, cloud-based storage, a hard drive, flash memory, some other form of solid-state data storage, or any suitable combination thereof. The storage repository 1531 can be located on multiple physical machines, each storing all or a portion of the communication protocols 1532, the algorithms 1533, and/or the stored data 1534 according to some example embodiments. Each storage unit or device can be physically located in the same or in a different geographic location.

The storage repository 1531 can be operatively connected to the control engine 1506. In one or more example embodiments, the control engine 1506 includes functionality to communicate with the users 1451 (including associated user systems 1455), the sensor devices 1460, the network manager 1480, and the other components in the system 1400. More specifically, the control engine 1506 sends information to and/or obtains information from the storage repository 1531 in order to communicate with the users 1451 (including associated user systems 1455), the sensor devices 1460, the network manager 1480, and the other components of the system 1400. As discussed below, the storage repository 1531 can also be operatively connected to the communication module 1507 in certain example embodiments.

In certain example embodiments, the control engine 1506 of the controller 1404 controls the operation of one or more components (e.g., the communication module 1507, the timer 1535, the transceiver 1524) of the controller 1404. For example, the control engine 1506 can activate the communication module 1507 when the communication module 1507 is in "sleep" mode and when the communication module 1507 is needed to send data obtained from another component (e.g., a sensor device 1460) in the system 1400. In addition, the control engine 1506 of the controller 1404 can control the operation of one or more other components (e.g., a valve 1485, a subsea production system component 1409, a subsea production system component 1509), or portions thereof, of the system 1400.

The control engine 1506 of the controller 1404 can communicate with one or more other components of the system 1400. For example, the control engine 1506 can use one or more protocols 1532 to facilitate communication with the sensor devices 1460 to obtain data (e.g., measurements of various parameters, such as temperature, pressure, and flow rate), whether in real time or on a periodic basis and/or to instruct a sensor device 1460 to take a measurement. The control engine 1506 can use measurements of parameters taken by sensor devices 1460 during a stage of a field operation, as well as one or more protocols 1532 and/or algorithms 1533, to determine whether the operation of a subsea production system component 1409 (or portion thereof), a subsea production system component 1509 (or portion thereof), and/or any other subsea component (or portion thereof) of the system 1400 needs to be started, stopped, or adjusted. Such a determination can be made in real time or on a periodic (e.g., every 30 seconds) basis.

The control engine 1506 can generate and process data associated with control, communication, and/or other signals sent to and obtained from the users 1451 (including associated user systems 1455), the sensor devices 1460, the network manager 1480, and the other components of the system 1400. In certain embodiments, the control engine 1506 of the controller 1404 can communicate with one or more components of a system external to the system 1400. For example, the control engine 1506 can interact with an inventory management system by ordering replacements for components or pieces of equipment (e.g., a sensor device 1460, a valve 1485, a motor) within the system 1400 that has failed or is failing. As another example, the control engine 1506 can interact with a contractor or workforce scheduling system by arranging for the labor needed to replace a component or piece of equipment in the system 1400. In this way and in other ways, the controller 1404 is capable of performing a number of functions beyond what could reasonably be considered a routine task.

In certain example embodiments, the control engine 1506 can include an interface that enables the control engine 1506 to communicate with the sensor devices 1460, the user systems 1455, the network manager 1480, and the other components of the system 1400. For example, if a user system 1455 operates under IEC Standard 62386, then the user system 1455 can have a serial communication interface that will transfer data to the controller 1404. Such an interface can operate in conjunction with, or independently of, the protocols 1532 used to communicate between the controller 1404 and the users 1451 (including corresponding user systems 1455), the sensor devices 1460, the network manager 1480, and the other components of the system 1400.

The control engine 1506 (or other components of the controller 1404) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 1507 of the controller 1404 determines and implements the communication protocol (e.g., from the protocols 1532 of the storage repository 1531) that is used when the control engine 1506 communicates with (e.g., sends signals to, obtains signals from) the user systems 1455, the sensor devices 1460, the network manager 1480, and the other components of the system 1400. In some cases, the communication module 1507 accesses the stored data 1534 to determine which communication protocol is used to communicate with another component of the system 1400. In addition, the communication module 1507 can identify and/or interpret the communication protocol of a communication obtained by the controller 1404 so that the control engine 1506 can interpret the communication. The communication module 1507 can also provide one or more of a number of other services with respect to data sent from and obtained by the controller 1404. Such services can include, but are not limited to, data packet routing information and procedures to follow in the event of data interruption.

The timer 1535 of the controller 1404 can track clock time, intervals of time, an amount of time, and/or any other measure of time. The timer 1535 can also count the number of occurrences of an event, whether with or without respect to time. Alternatively, the control engine 1506 can perform a counting function. The timer 1535 is able to track multiple time measurements and/or count multiple occurrences concurrently. The timer 1535 can track time periods based on an instruction obtained from the control engine 1506, based on an instruction obtained from a user 1451, based on an instruction programmed in the software for the controller 1404, based on some other condition (e.g., the occurrence of an event) or from some other component, or from any combination thereof. In certain example embodiments, the timer 1535 can provide a time stamp for each packet of data obtained from another component (e.g., a sensor device 1460) of the system 1400.

The power module 1530 of the controller 1404 obtains power from a power supply (e.g., AC mains) and manipulates (e.g., transforms, rectifies, inverts) that power to provide the manipulated power to one or more other components (e.g., the timer 1535, the control engine 1506) of the controller 1404, where the manipulated power is of a type (e.g., alternating current, direct current) and level (e.g., 12V, 24V, 120V) that can be used by the other components of the controller 1404. In some cases, the power module 1530 can also provide power to one or more of the sensor devices 1460.

The power module 1530 can include one or more of a number of single or multiple discrete components (e.g., transistor, diode, resistor, transformer) and/or a microprocessor. The power module 1530 may include a printed circuit board, upon which the microprocessor and/or one or more discrete components are positioned. In addition, or in the alternative, the power module 1530 can be a source of power in itself to provide signals to the other components of the controller 1404. For example, the power module 1530 can be or include an energy storage device (e.g., a battery). As another example, the power module 1530 can be or include a localized photovoltaic power system.

The hardware processor 1521 of the controller 1404 executes software, algorithms (e.g., algorithms 1533), and firmware in accordance with one or more example embodiments. Specifically, the hardware processor 1521 can execute software on the control engine 1506 or any other portion of the controller 1404, as well as software used by the users 1451 (including associated user systems 1455), the network manager 1480, and/or other components of the system 1400. The hardware processor 1521 can be an integrated circuit, a central processing unit, a multi-core processing chip, SoC, a multi-chip module including multiple multi-core processing chips, or other hardware processor in one or more example embodiments. The hardware processor 1521 can be known by other names, including but not limited to a computer processor, a microprocessor, and a multi-core processor.

In one or more example embodiments, the hardware processor 1521 executes software instructions stored in memory 1522. The memory 1522 includes one or more cache memories, main memory, and/or any other suitable type of memory. The memory 1522 can include volatile and/or non-volatile memory. The memory 1522 can be discretely located within the controller 1404 relative to the hardware processor 1521. In certain configurations, the memory 1522 can be integrated with the hardware processor 1521.

In certain example embodiments, the controller 1404 does not include a hardware processor 1521. In such a case, the controller 1404 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 1404 (or portions thereof) to be programmable and function according to certain logic rules and thresholds without the use of a hardware processor. Alternatively, FPGAs, IGBTs, ICs, and/or similar devices can be used in conjunction with one or more hardware processors 1521.

The transceiver 1524 of the controller 1404 can send and/or obtain control and/or communication signals. Specifically, the transceiver 1524 can be used to transfer data between the controller 1404 and the users 1451 (including associated user systems 1455), the sensor devices 1460, the network manager 1480, and the other components of the system 1400. The transceiver 1524 can use wired and/or wireless technology. The transceiver 1524 can be configured in such a way that the control and/or communication signals sent and/or obtained by the transceiver 1524 can be obtained and/or sent by another transceiver that is part of a user system 1455, a sensor device 1460, the network manager 1480, and/or another component of the system 1400. The transceiver 1524 can send and/or obtain any of a number of signal types, including but not limited to radio frequency signals and sound waves.

When the transceiver 1524 uses wireless technology, any type of wireless technology can be used by the transceiver 1524 in sending and obtaining signals. Such wireless technology can include, but is not limited to, Wi-Fi, Zigbee, VLC, cellular networking, BLE, UWB, and Bluetooth. The transceiver 1524 can use one or more of any number of suitable communication protocols (e.g., ISA100, HART) when sending and/or obtaining signals.

Optionally, in one or more example embodiments, the security module 1523 secures interactions between the controller 1404, the users 1451 (including associated user systems 1455), the sensor devices 1460, the network manager 1480, and the other components of the system 1400. More specifically, the security module 1523 authenticates communication from software based on security keys verifying the identity of the source of the communication. For example, user software may be associated with a security key enabling the software of a user system 1455 to interact with the controller 1404. Further, the security module 1523 can restrict receipt of information, requests for information, and/or access to information.

A user 1451 (including an associated user system 1455), the sensor devices 1460, the network manager 1480, and the other components of the system 1400 can interact with the controller 1404 using the application interface 1526. Specifically, the application interface 1526 of the controller 1404 obtains data (e.g., information, communications, instructions, updates to firmware) from and sends data (e.g., information, communications, instructions) to the user systems 1455 of the users 1451, the sensor devices 1460, the network manager 1480, and/or the other components of the system 1400. Examples of an application interface 1526 can be or include, but are not limited to, an application programming interface, a web service, a data protocol adapter, some other hardware and/or software, or any suitable combination thereof. Similarly, the user systems 1455 of the users 1451, the sensor devices 1460, the network manager 1480, and/or the other components of the system 1400 can include an interface (similar to the application interface 1526 of the controller 1404) to obtain data from and send data to the controller 1404 in certain example embodiments.

In addition, as discussed above with respect to a user system 1455 of a user 1451, one or more of the sensor devices 1460, the network manager 1480, and/or one or more of the other components of the system 1400 can include a user interface. Examples of such a user interface can include, but are not limited to, a graphical user interface, a touchscreen, a keyboard, a monitor, a mouse, some other hardware, or any suitable combination thereof.

The controller 1404, the users 1451 (including associated user systems 1455), the sensor devices 1460, the network manager 1480, and the other components of the system 1400 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 1404. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 15.

Further, as discussed above, such a system can have corresponding software (e.g., user system software, sensor device software, controller software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the overall system (e.g., system 1400).

Figure 16:
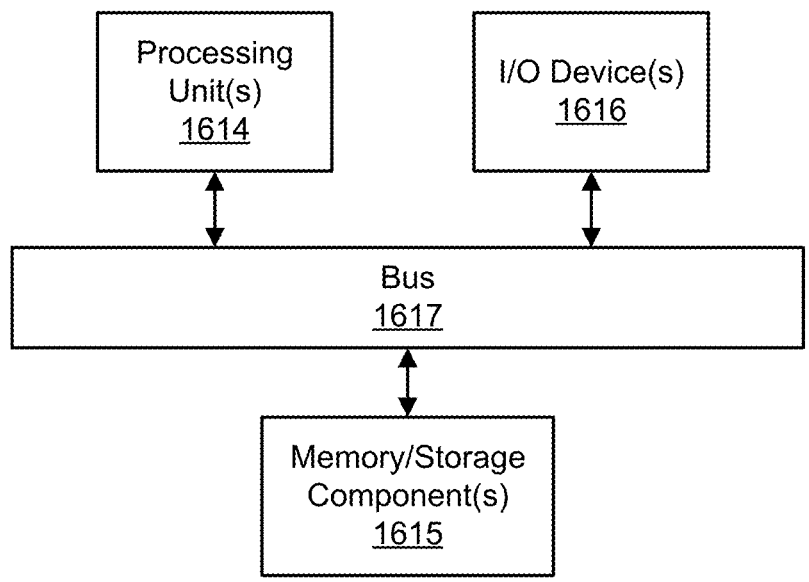
FIG. 16 shows a diagram of a computing system according to certain example embodiments.

FIG. 16 illustrates one embodiment of a computing device 1618 that implements one or more of the various techniques described herein, and which is representative, in whole or in part, of the elements described herein pursuant to certain example embodiments. For example, a controller 1404 (including components thereof, such as a control engine 1506, a hardware processor 1520, a storage repository 1531, a power module 1530, and a transceiver 1524) can be considered a computing device 1618. Computing device 1618 is one example of a computing device and is not intended to suggest any limitation as to scope of use or functionality of the computing device and/or its possible architectures. Neither should the computing device 1618 be interpreted as having any dependency or requirement relating to any one or combination of components illustrated in the example computing device 1618.

The computing device 1618 includes one or more processors or processing units 16116, one or more memory/storage components 1615, one or more input/output (I/O) devices 1616, and a bus 1617 that allows the various components and devices to communicate with one another. The bus 1617 represents one or more of any of several types of bus structures, including a memory bus or memory controller, a peripheral bus, an accelerated graphics port, and a processor or local bus using any of a variety of bus architectures. The bus 1617 includes wired and/or wireless buses.

The memory/storage component 1615 represents one or more computer storage media. The memory/storage component 1615 includes volatile media (such as random access memory (RAM)) and/or nonvolatile media (such as read only memory (ROM), flash memory, optical disks, magnetic disks, and so forth). The memory/storage component 1615 includes fixed media (e.g., RAM, ROM, a fixed hard drive, etc.) as well as removable media (e.g., a Flash memory drive, a removable hard drive, an optical disk, and so forth).

One or more I/O devices 1616 allow a user 1451 to enter commands and information to the computing device 1618, and also allow information to be presented to a user 251 and/or other components or devices. Examples of input devices 1616 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 1618 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 1618 includes at least the minimal processing, input, and/or output means necessary to practice one or more embodiments.

Further, those skilled in the art will appreciate that one or more elements of the aforementioned computer device 1618 is located at a remote location and connected to the other elements over a network in certain example embodiments. Further, one or more embodiments is implemented on a distributed system having one or more nodes, where each portion of the implementation (e.g., a subsea production system component 1409, a subsea production system component 1509) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 17:
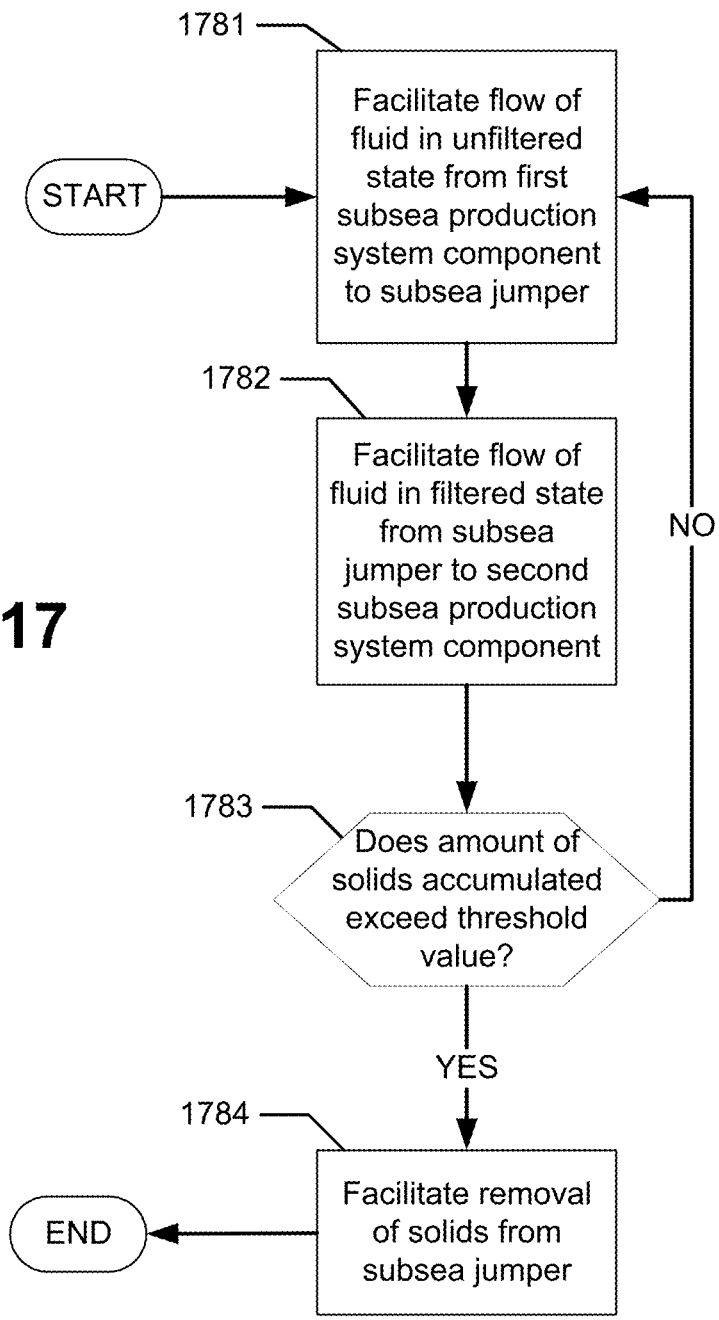
FIG. 17 shows a flowchart of a method for filtering a fluid produced during a subsea field operation according to certain example embodiments.

FIG. 17 shows a flowchart 1789 of a method for filtering a fluid produced during a subsea field operation according to certain example embodiments. While the various steps in this flowchart 1789 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 17 may be included in performing this method. Accordingly, the specific arrangement of steps should not be construed as limiting the scope. Further, a particular computing device, such as the computing device discussed above with respect to FIG. 16, can be used to perform one or more of the steps for the method shown in FIG. 17 in certain example embodiments. Any of the functions performed below by a controller (e.g., controller 1404) can involve the use of one or more protocols (e.g., protocols 1532), one or more algorithms (e.g., algorithms 1533), and/or stored data (e.g., stored data 1534). Alternatively, a user (e.g., user 1451), including an associated user system (e.g., user system 1455) can perform some or all of the method set forth in FIG. 17.

For illustrative purposes, the method shown in FIG. 17 is described an example that can be performed by using the example system 1400 of FIG. 14. The method of FIG. 17 can also be performed using any of the other systems, any of the subsystems, any of the example subsea jumpers (e.g., subsea jumper 1450, subsea jumper 1150, subsea jumper 1250, subsea jumper 1350), and/or variations thereof that are described herein. Further, systems for filtering a fluid produced during a subsea field operation can perform other functions using other methods in addition to and/or aside from those shown in FIG. 17.

Referring to FIGS. 1 through 17, the method shown in the flowchart 1789 of FIG. 17 begins at the START step and proceeds to step 1781, where flow of a fluid in an unfiltered state 1437 is facilitated from a subsea production system component 1409 to a subsea jumper 1450. The flow of the fluid can be facilitated by a user 1451 (including an associated user system 1455) and/or by a controller 1404 using one or more protocols 1532 and/or one or more algorithms 1533. The flow of the fluid from a subsea production system component 1409 to a subsea jumper 1450 can be facilitated by operating one or more valves 1485 and/or one or more other pieces of equipment (e.g., a pump motor) in the system 1400.

In certain example embodiments, the subsea jumper 1450 includes a filter 1453 through which the fluid flows. The filter 1453 of the subsea jumper 1450 is configured to remove at least some solids from the fluid as the fluid passes through the filter 1453. Specifically, as the fluid reaches the subsea jumper 1450, the fluid enters a flow area (e.g., flow area 1108) and passes through the filter 1453 to another flow area (e.g., flow area 1156). As the fluid flows through the filter 1453, at least some of the solids in the fluid are accumulated by the filter 1453, and fluid changes from an unfiltered state 1437 to a filtered state 1438.

In step 1782, flow of a fluid in the filtered state 1438 is facilitated from the subsea jumper 1450 to another subsea production system component 1509. The flow of the fluid can be facilitated by a user 1451 (including an associated user system 1455) and/or by a controller 1404 using one or more protocols 1532 and/or one or more algorithms 1533. The flow of the fluid from the subsea jumper 1450 to another subsea production system component 1509 can be facilitated by operating one or more valves 1485 and/or one or more other pieces of equipment (e.g., a pump motor) in the system 1400.

In step 1783, a determination is made as to whether the amount of solids accumulated by the filter 1453 of the subsea jumper 1450 exceeds a threshold value. The determination can be made by a user 1451 (including an associated user system 1455) and/or by a controller 1404 using one or more protocols 1532 and/or one or more algorithms 1533. The threshold value can be part of stored data 1534. The threshold value can be established by a user 1451 (including an associated user system 1455) and/or by a controller 1404 using one or more protocols 1532 and/or one or more algorithms 1533. The threshold value can be based on one or more of a number of factors, including but not limited to historical data, content of the fluid in the unfiltered state 1437, configuration (e.g., size, shape, technology) of the filter 1453, flow rate, pressure, and whether the fluid has already been filtered upstream. The determination can additionally be made using measurements made by one or more sensor devices 1460. If the amount of solids accumulated by the filter 1453 of the subsea jumper 1450 exceeds the threshold value, then the process proceeds to step 1784. If the amount of solids accumulated by the filter 1453 of the subsea jumper 1450 does not exceed the threshold value, then the process reverts to step 1781.

In step 1784, removal of the solids from the subsea jumper 1450 is facilitated. The removal of the solids from the filter 1453 of the subsea jumper 1450 can be facilitated by a user 1451 (including an associated user system 1455) and/or by a controller 1404 using one or more protocols 1532 and/or one or more algorithms 1533. Removal of the solids from the subsea jumper 1450 can be facilitated by operating one or more valves 1485 and/or one or more other pieces of equipment (e.g., a pigging device, a ROV with vacuuming capability) in the system 1400. When step 1784 is complete, the process can proceed to the END step.

The operation of one or more of the valves 1485 and/or other pieces of equipment in the system 1400, the decision to operate one or more of the valves 1485 and/or other pieces of equipment in the system 1400, how to operate one or more of the valves 1485 and/or other pieces of equipment in the system 1400, for how long to leave one or more of the operated valves 1485 and/or other pieces of equipment in the system 1400 in a position or operational mode, and/or other similar decisions can be performed by a user 1451 (including an associated user system 1455) and/or by a controller 1404 using one or more protocols 1532 and/or one or more algorithms 1533. As another alternative, a subsea jumper 1450 can be physically inserted into and/or removed from the system 1400 using disconnects 1449 integrated with the piping 1488 without interrupting the flow of the fluid through the piping 1488 within, upstream of the subsea jumper 1450, or downstream of the subsea jumper 1450.

FIGS. 18A and 18B show another subassembly 1897 that includes a subsea jumper 1850 according to certain example embodiments. Specifically, FIG. 18A shows a side sectional view of the subassembly 1897, and FIG. 18B shows a detailed view of the subassembly 1197 of FIG. 18A. Referring to FIGS. 1 through 18B, the subassembly 1897 of FIGS. 18A and 18B includes the subsea jumper 1850 with a pig 1846 traveling therein. The subsea jumper 1850 of the subassembly 1897 is substantially the same as the subsea jumper 1350 of FIGS. 13A and 13B, except as described below.

For example, the subsea jumper 1850 of FIGS. 18A and 18B includes a housing 1839, a filter 1853 disposed within the housing 1839, an end cap 1865-1, and another end cap 1865-2. The housing 1839 is cylindrical and has a housing wall 1854 that forms a cavity 1859. The housing 1839 has an upstream end and a downstream end that define a length of the housing 1839. The upstream end of the housing 1839 is configured to couple to another subsea production system component (e.g., piping). The downstream end of the housing 1839 is configured to couple to another subsea production system component.

For example, the subsea jumper 1850 of FIGS. 18A and 18B includes a housing 1839, a filter 1853 disposed within the housing 1839, an end cap 1865-1, and another end cap 1865-2. The housing 1839 is cylindrical and has a housing wall 1854 that forms a cavity 1859. The housing 1839 has an upstream end and a downstream end that define a length of the housing 1839. The upstream end of the housing 1839 is configured to couple to another subsea production system component (e.g., piping). The downstream end of the housing 1839 is configured to couple to another subsea production system component.

The filter 1853 has a distal wall 1868 that does not allow any of the fluid to pass therethrough. In this way, at the distal end (in this example, the downstream end) of the subsea jumper 1850, the wall 1868 serves as a barrier between flow area 1808 and flow area 1856. Adjacent to the distal end of the filter 1853 and the wall 1868, the flow area 1856 has one or more channels 1857 that draw in the outer perimeter of that part of the flow area 1856 as the inner perimeter of that part of the flow area 1856 is reduced or disappears.

The end cap 1865-2 in this case is coupled to one end (in this case, the downstream end) of the housing 1839 of the subsea jumper 1850, and the end cap 1865-1 is coupled to the other end (in this case, the upstream end) of the housing 1839 of the subsea jumper 1850. In this case, end cap 1865-1 includes an end plate 1861-1, a sensor device port 1862-1, and a distal wall 1867. All of these parts of the end cap 1865-1 fit over the filter 1853, leaving the flow area 1808 accessible (e.g., to piping) through an aperture 1873-1 that traverses the center of the end cap 1865-1. The distal wall 1867 creates a non-passible barrier at the upstream end of the flow area 1856. The end plate 1861-1 of the end cap 1865-1 can include one or more coupling features that are configured to directly or indirectly couple to another subsea production system component of the system. In this example, the sensor device port 1862-1 of the end cap 1865-1 is configured to receive a sensor device that is configured to measure one or more parameters.

The end cap 1865-2 in this example includes an end plate 1861-2, a sensor device port 1862-3, a transition feature 1866, a check valve 1885, and a retractable seal 1844-5 for the pig 1846. The transition feature 1866 is a conically-shaped wall that helps funnel the fluid from the flow area 1856 to the aperture 1873-2 that traverses the center of the end cap 1865-2. The end plate 1861-2 of the end cap 1865-2 can include one or more coupling features that are configured to directly or indirectly couple to another subsea production system component. The sensor device port 1862-3 of the end cap 1865-2 is configured to receive a sensor device that is configured to measure one or more parameters.

The check valve 1885 of the end cap 1865-2 is configured to allow the pig 1846 to pass therethrough and continue past the end cap 1865-2 to the adjacent subsea production system component. Specifically, when the valve 1885 is triggered, the pig 1864 is allowed to pass. The valve 1885 can be triggered by any of a number of components and/or factors, including but not limited to a change in pressure, extension of the seal 1844-5, and a change in flow rate of the fluid. In certain example embodiments, the check valve 1885 is triggered, directly or indirectly, by proximity of the pig 1846 to the check valve 1885. When the check valve 1885 is triggered, the flow of the fluid in the filtered state 1838 can be stopped or altered.

The pig 1846 is shown located within the cavity 1859 in the flow area 1808. The pig 1846 is traveling along the subsea jumper 1850 in the same direction as the fluid in the unfiltered state 1837. The size (e.g., the outer diameter) of the pig 1846 is substantially the same as the inner diameter of the filter 1853. In such a case, the pig 1846 can clean any debris that is on the inner surface of the filter 1853 as the pig 1846 travels along the length of the subsea jumper 1850.

The subsea jumper 1850 in this case includes a number (in this case, five) of retractable seals 1844. In this case, all of the retractable seals 1844 are configured substantially identical to each other. For example, each retractable seal 1844 can utilize a resilient device (e.g., a tension spring) to keep a rounded plunger in a normally-retracted position. As the pig 1844 approaches, the curvature of the leading end of the pig 1844 forces the rounded plunger outward until the top end of the plunger substantially abuts against the inner surface of the housing wall 1854 of the subsea jumper 1850.

As long as the body of the pig 1846 remains in contact with the rounded plunger of the retractable seal 1844, as shown in FIG. 18B with respect to retractable seal 1844-4, the outer part of the plunger maintains a seal against the inner surface of the housing wall 1854, preventing the fluid in the filtered state 1838 from flowing therethrough in the flow area 1856. When the pig 1846 travels far enough along the subsea jumper 1850 to cease contacting the rounded plunger of a retractable seal 1844, as shown in FIG. 18B with respect to retractable seal 1844-3, the rounded plunger is forced inward by the resilient device of the retractable seal 1844, allowing the fluid in the filtered state 1838 to flow in that part of the flow area 1856.

Retractable seal 1844-1 is located adjacent to the end cap 1865-1. Retractable seal 1844-5 is located adjacent to the end cap 1865-2. Retractable seal 1844-3 is located in the approximate center along the length of the subsea jumper 1850. Retractable seal 1844-2 is located approximately halfway between retractable seal 1844-1 and retractable seal 1844-3. Retractable seal 1844-4 is located approximately halfway between retractable seal 1844-5 and retractable seal 1844-3. When a subsea jumper 1850 has multiple retractable seals 1844, they can be spaced substantially equidistantly from each other (as in this case) or in any other manner. An example subsea jumper 1844 can have any of a number of retractable seals 1844. The configuration of a retractable seal 1844 can vary, provided that the retractable seal 1844 provides a temporary barrier within the flow area 1856 as the pig 1846 passes adjacent thereto.

Example embodiments can be used to provide for filtering solids, in real time, from a fluid produced during a subsea field operation. Example embodiments can be used during a stage of a field operation when the subterranean resource is directed to a subsea pipeline. Example embodiments are located and performed entirely subsea. In some cases, the filter of an example subsea jumper can be cleaned of accumulated solids or otherwise maintained without interrupting the subsea field operation. Example embodiments are designed for prolonged reliable operation in spite of the harsh subsea environment in which example embodiments operate. Example embodiments can provide a number of benefits. Such other benefits can include, but are not limited to, improved system efficiency, extended production life of a well, reduced use of resources, cost savings, operational flexibility, and compliance with applicable industry standards and regulations.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A subsea jumper for filtering a fluid produced during a subsea field operation, the subsea jumper comprising:
a housing comprising a housing wall forming a cavity, wherein the housing has an upstream end and a downstream end that define a length of the housing, wherein the upstream end of the housing is configured to couple to a first subsea production system component, and wherein the downstream end of the housing is configured to couple to a second subsea production system component; and
a filter disposed within the cavity along the length, wherein the filter defines a first flow area and a second flow area within the cavity,
wherein the upstream end is configured to receive the fluid in an unfiltered state from the first subsea production system component into the first flow area within the cavity, wherein the downstream end is configured to distribute the fluid in a filtered state from the second flow area in the cavity to the second subsea production system component, wherein the fluid in the unfiltered state comprises a subterranean resource and solids, wherein the filter is configured to remove at least some of the solids as the fluid passes through the filter from the first flow area to the second flow area to yield the fluid in the filtered state, and wherein the filter is positioned within the cavity by a plurality of baffles disposed between the filter and the housing wall.

2. The subsea jumper of claim 1, wherein the filter comprises a screen.

3. The subsea jumper of claim 1, wherein the housing and the filter are cylindrical.

4. The subsea jumper of claim 1, wherein the first flow area is disposed within the filter, and wherein the second flow area is disposed in an annulus formed between the filter and the housing wall.

5. The subsea jumper of claim 4, wherein the first flow area is piggable.

6. The subsea jumper of claim 4, wherein the filter has a diameter that is configured to be substantially the same as the diameter of a pipe disposed between the housing and the first subsea production system component.

7. The subsea jumper of claim 1, further comprising:
a sensor device that measures a parameter associated with filtering the fluid.

8. The subsea jumper of claim 7, further comprising:
a controller communicably coupled to the sensor device, wherein the controller is configured to initiate cleaning of the filter when the parameter measured by the sensor device exceeds a threshold value.

9. The subsea jumper of claim 1, further comprising:
a filter cleaning apparatus disposed within the cavity, wherein the filter cleaning apparatus is configured to remove the at least some of the solids collected by the filter from the cavity.

10. The subsea jumper of claim 9, wherein the filter cleaning apparatus comprises a flow alternating check valve.

11. The subsea jumper of claim 1, wherein the housing wall comprises a port that is configured to receive a sensor device for measuring a parameter associated with filtering the fluid.

12. A subsea system for producing a fluid during a subsea field operation, the subsea system comprising:
a first pipe that receives the fluid in an unfiltered state from a first subsea system component;
a second pipe that transports the fluid in a filtered state to a second subsea system component;
a subsea jumper coupled to the first pipe and the second pipe, wherein the subsea jumper comprises:
a housing comprising a housing wall forming a cavity having a length, wherein the housing wall has a first end coupled to the first pipe and a second end coupled to the second pipe; and
a filter disposed within the cavity along the length, wherein the filter defines a first flow area and a second flow area within the cavity,
wherein the first flow area receives the fluid in the unfiltered state at the first end, wherein the fluid, after passing through the filter from the first flow area, flows through the second flow area to the second end in the filtered state, wherein the fluid in the unfiltered state comprises a subterranean resource and solids, and wherein the filter is configured to remove at least some of the solids as the fluid passes through the filter from the first flow area to the second flow area;
a third pipe in parallel with the subsea jumper;
a first valve disposed in the second pipe in series with the subsea jumper; and
a second valve disposed in the third pipe, wherein the subsea jumper is bypassed through the third pipe when the first valve is in a closed position and when the second valve is in an open position.

13. The subsea system of claim 12, further comprising:
an access port disposed in the second pipe, wherein the access port is configured to receive a filter cleaning device.

14. The subsea system of claim 12, further comprising:
a second subsea jumper disposed in parallel with the subsea jumper, wherein the second subsea jumper comprises:
a second housing comprising a second housing wall forming a second cavity having a second length, wherein the second housing wall has the first end coupled to the first pipe and the second end coupled to the third pipe; and
a second filter disposed within the second cavity along the second length, wherein the second filter defines the first flow area and the second flow area within the second cavity,
wherein the first flow area of the second subsea jumper receives the fluid in the unfiltered state at the first end when the subsea jumper is bypassed, wherein the fluid, after passing through the second filter from the first flow area, flows through the second flow area to the second end in the filtered state, and wherein the second filter is configured to remove the at least some of the solids as the fluid passes through the second filter from the first flow area to the second flow area.

15. The subsea system of claim 14, further comprising:
a second access port disposed in the third pipe, wherein the second access port is configured to receive the filter cleaning device.

16. The subsea system of claim 14, further comprising:
a fourth pipe in parallel with the subsea jumper and the second subsea jumper; and
a third valve disposed in the fourth pipe,
wherein the subsea jumper and the second subsea jumper are bypassed through the fourth pipe when the first valve and the second valve are in the closed position and when the third valve is in the open position.

17. A method for filtering a fluid produced during a subsea field operation, the method comprising:

facilitating flow of a fluid in an unfiltered state from a first subsea production system component through a subsea jumper comprising a housing having a housing wall forming a cavity, wherein the housing has an upstream end and a downstream end that define a length of the housing, wherein the upstream end of the housing is coupled to the first subsea production system component, wherein the subsea jumper comprises a filter through which the fluid flows, wherein the filter is disposed within the cavity along the length, wherein the filter defines a first flow area and a second flow area within the cavity, wherein the upstream end of the housing is configured to receive the fluid in an unfiltered state from the first subsea production system component into the first flow area within the cavity, and wherein the filter is configured to remove at least some solids from the fluid as the fluid passes through the filter from the first flow area to the second flow area to put the fluid in a filtered state; and facilitating flow of the fluid in the filtered state from the subsea jumper to a second subsea production system component, wherein the downstream end of the housing is coupled to the second subsea production system component, wherein the downstream end of the housing is configured to distribute the fluid in the filtered state from the second flow area in the cavity to the second subsea production system component, wherein the fluid in the unfiltered state comprises a subterranean resource and the solids, and wherein the filter is positioned within the cavity by a plurality of baffles disposed between the filter and the housing wall.

18. The method of claim 17, further comprising:

determining that an amount of the solids accumulated by the filter exceeds a threshold value; and facilitating removal of the at least some solids from the subsea jumper during the subsea field operation.

* * * * *